(12) United States Patent
Hoover

(10) Patent No.: US 11,016,968 B1
(45) Date of Patent: May 25, 2021

(54) MUTATION ARCHITECTURE FOR CONTEXTUAL DATA AGGREGATOR

(71) Applicant: Amazon Technologies, Inc., Seattle, WA (US)

(72) Inventor: Thomas Jay Hoover, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 326 days.

(21) Appl. No.: 16/134,617

(22) Filed: Sep. 18, 2018

(51) Int. Cl.
*G06F 16/00* (2019.01)
*G06F 16/2452* (2019.01)
*G10L 15/18* (2013.01)
*G10L 15/26* (2006.01)
*G10L 15/22* (2006.01)
*G06F 16/242* (2019.01)

(52) U.S. Cl.
CPC ...... *G06F 16/24522* (2019.01); *G06F 16/244* (2019.01); *G10L 15/1815* (2013.01); *G10L 15/22* (2013.01); *G10L 15/26* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 10,803,865 | B2* | 10/2020 | Naughton | G06F 3/167 |
| 2009/0299745 | A1* | 12/2009 | Kennewick | G10L 15/22 |
| | | | | 704/257 |
| 2016/0098992 | A1* | 4/2016 | Renard | G06F 3/167 |
| | | | | 704/275 |
| 2016/0259775 | A1* | 9/2016 | Gelfenbeyn | G10L 15/26 |

OTHER PUBLICATIONS

Author unknown; "Introduction to GraphQL"; *Github*; Retrieved from https://graphql.github.io/learn/ on Sep. 18, 2018; 3 pgs.

* cited by examiner

*Primary Examiner* — Anhtai V Tran
(74) *Attorney, Agent, or Firm* — K&L Gates LLP

(57) ABSTRACT

Devices and techniques are generally described for a mutation architecture for a contextual data aggregator. In some examples, a context aggregator system may determine a first operation associated with a first directive. In at least some examples, the first operation may be operable to store contextual data. In some examples, the context aggregator system may receive a first command including the first directive. In various examples, the context aggregator system may generate a first extension supporting the first operation based at least in part on the first directive. In some examples, the context aggregator system may receive a second command comprising the first extension and first contextual data. In at least some examples, the context aggregator system may store the first contextual data in a database based at least in part on the first extension.

20 Claims, 18 Drawing Sheets

| Parameters | None |
|---|---|
| Example | ```
query {
  device(id:1234) {
    deleteMusicPlaybackStatus
  }
}
``` |

FIG. 5A

| Parameters | None |
|---|---|
| Example | ```
query {
    device(id:1234) {
        existsMusicPlaybackStatus
    }
}
``` |

FIG. 5B

| Parameters | none |
|---|---|
| Example | ```
query {
  device(id:1234) {
    revisionOfMusicPlaybackStatus
  }
}
``` |

FIG. 5C

| Parameters | none |
|---|---|
| Example | ```
query {
  device(id:1234) {
    timestampOfMusicPlaybackStatus
  }
}
``` |

FIG. 5D

| Parameters | • newValue - the value to be set<br>• ifEquals - the existing value that the field must be in order for the new value to be set<br>• ifNotSet - boolean which if true indicates that it can only override null (default: false)<br>• ifRevision - the version of the field that can be overwritten |
|---|---|
| Example | ```
mutation {
  device(id:1234) {
    setMusicPlaybackStatus(....)
  }
}
``` |

FIG. 5E

Parameters

- newValue - the value to be set
- ifEquals - the existing value that the field must be in order for the new value to be set
- ifNotSet - boolean which if true indicates that it can only override null (default: false)
- ifRevision - the version of the field that can be overwritten

Example

```
mutation {
    device(id:1234) {
        getSetMusicPlaybackStatus(....)
    }
}
```

FIG. 5F

Parameters

- delta - the value to add to the number

Example

```
mutation {
  device(id:1234) {
    addMusicQueuePosition(delta:1)
  }
}
```

FIG. 5G

| Parameters | none |
|---|---|
| Example | ```
query {
  device(id:1234) {
    firstMusicQueue
  }
}
``` |

FIG. 5H

| Parameters | none |
|---|---|
| Example | ```
query {
  device(id:1234) {
    lastMusicQueue
  }
}
``` |

FIG. 5I

Parameters
- start – index (zero-based) to start from
- end – index (zero-based) to end at Negative numbers are assumed to be relative to the end of the list

Example

```
query {
    device(id:1234) {
        getMusicQueue(start:0, end:5)
    }
}
```

FIG. 5J

MUTATION ARCHITECTURE FOR CONTEXTUAL DATA AGGREGATOR

BACKGROUND

Automatic speech recognition (ASR) combined with language processing techniques may enable a computing device to retrieve and process commands based on a user's spoken commands. In some systems, speech recognition and/or voice-controlled devices activate upon detection of a spoken "wake-word" or "wake command". Natural language processing is used to translate the spoken commands into computer-executable instructions. The executable instructions are executed and a corresponding task is performed. Such speech recognition and voice control may be used by personal computers, hand-held devices, telephone computer systems, and a wide variety of other computing devices to improve human-computer interactions.

BRIEF DESCRIPTION OF DRAWINGS

FIGS. 5A-5J depict various example operations that may be made used to query, store, and/or modify contextual data, in accordance with various aspects of the present disclosure.

DETAILED DESCRIPTION

Figure 1:
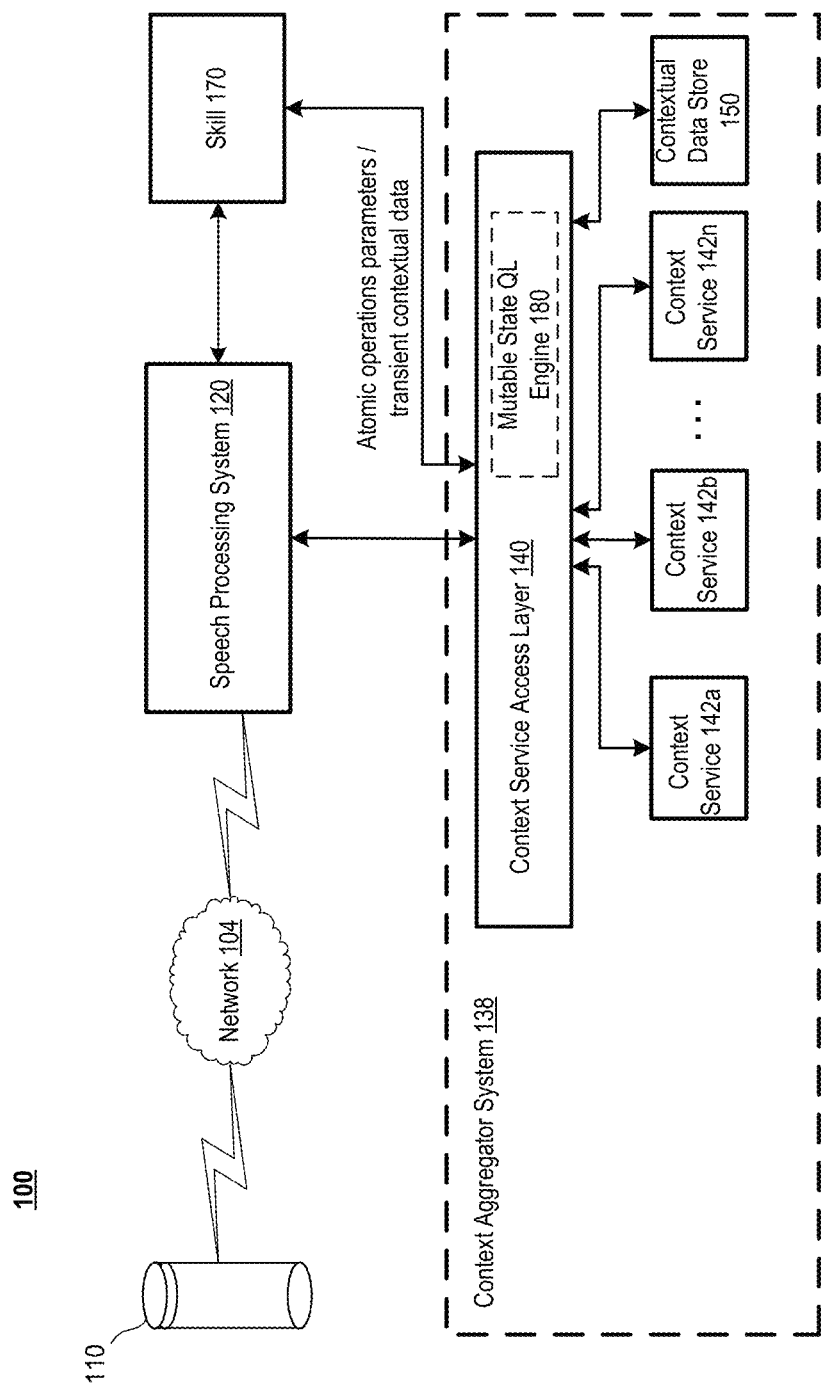
FIG. 1 is a conceptual illustration of a system including a mutation architecture for aggregation of contextual data, in accordance with various embodiments of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Automatic speech recognition (ASR) is a field of computer science, artificial intelligence, and linguistics concerned with transforming audio data representing speech into text data representative of that speech. Natural language understanding (NLU) is a field of computer science, artificial intelligence, and linguistics concerned with enabling computers to derive meaning from text input containing natural language, rather than specific commands or instructions. Text-to-speech (TTS) is a field of computer science, artificial intelligence, and linguistics concerned with enabling computers to output synthesized speech. ASR, NLU, and TTS may be used together as part of a speech processing system.

Spoken language understanding (SLU) is a field of computer science, artificial intelligence, and/or linguistics that receives spoken language as an input, interprets the input, and generates commands that may be executed by one or more other computing devices and/or speech processing components. In various examples, spoken language understanding may be a combination of ASR systems and NLU systems, while in other examples, spoken language understanding may be a single model effective to perform the functions of both ASR and NLU. In various further examples, SLU may include TTS where a machine learning model may receive input audio data (e.g., a user utterance) and may generate output audio data in response to the utterance.

A speech-controlled computing system may answer user commands requesting the output of content. For example, a user may say "Computer, what is the weather?" In response, the system may output weather information. For further example, a user may say "Computer, play music from the 90's." In response, the system may output music from the 1990's.

In various examples, in order to interpret a request, the NLU component of a speech processing system may have access to contextual information. Contextual information or data may be factual information contextualized to a particular entity. An entity may be a particular device ID, a particular IP address, an account ID, a request ID, etc. Various different partition keys may be used to define an entity. For example, for the user request "Computer, what is the weather?", the NLU component may have access to a device identifier (e.g., an identifier of a speech-processing device with one or more microphones receiving the spoken user request). In this example, the device identifier may be the partition key used to define the entity. The device identifier may be associated with a registered location of the device. For example, the device ID of the device receiving the spoken request, "Computer, what is the weather?," may be registered to an address located in Seattle, Wash. Accordingly, the NLU component may receive the contextual data (e.g., that the device ID of the device receiving the spoken request is located in Seattle, Wash.) along with text representing the spoken request. Accordingly, the contextual data may be used to form an inference that the user would like to know the weather in Seattle, Wash.

Storage and/or use of contextual data related to a particular person or device may be controlled by a user using privacy controls associated with a speech-controlled device and/or a companion application associated with a speech-controlled device. Accordingly, users may opt out of storage of contextual data and/or may select particular types of contextual data that may be stored while preventing aggregation and storage of other types of contextual data. Additionally, aggregation, storage, and use of contextual information, as described herein, may be subjected to privacy controls to ensure compliance with applicable privacy standards, such as the Health Insurance Portability and Accountability Act (HIPAA) and the General Data Protection Regulation (GDPR).

The system may be configured with multiple applications (e.g., thousands, tens of thousands, or more applications) that can be used to respond to user commands. Applications may sometimes be referred to herein as "skills". For example, the system may include weather applications, music applications, video applications, calendar applications, timer applications, general knowledge answering applications, game applications, etc. Further, the system may be capable of operating many different applications that have an overlapping subject matter. For example, the system may include more than one application that can execute commands related to requests for weather information. For further example, the system may include one or more medical information applications that execute commands requesting medical information. Determining which application or applications may be applicable to handle an incoming user command is a non-trivial determination. Contextual data may be used to determine the appropriate skill or skills to invoke based on a particular user utterance.

The invocation of a skill by a user's utterance may include a request that an action be taken. That request can be transmitted to a control system that will cause that action to be executed. For example, the user's utterance may be, "Computer, turn on the living room lights." In response, instructions may be sent to a "smart home" system to turn on the lights in the user's living room. Examples of skills include voice-enabled applications invoked by the Ski virtual personal assistant from Apple Inc. of Cupertino, Calif., voice-enabled actions invoked by the Google Assistant virtual personal assistant from Google LLC of Mountain View, Calif., or voice-enabled skills invoked by the Alexa virtual personal assistant from Amazon.com, Inc. of Seattle, Wash.

In various examples, statistical NLU may be used to reduce the cognitive burden on the user. In an NLU-based approach, user utterances are typically classified into one or more intents and/or to one or more supported skills (or into an unsupported skill) followed by further skill-dependent intent and slot analyses (e.g., intent classification and entity extraction). In various examples, statistical NLU may be used to determine a list of intents, domains, skills, etc., that the user may have intended to invoke. The list of intents, domains, skills, etc. may be selected based at least in part on contextual data provided to the NLU. In some examples, the list of intents and/or domains (and/or other NLU results) may be ranked using a ranker component. Intents may be passed to an appropriate skill to perform an action in response to the request. In the example above where the user asks "Computer, what is the weather?" The intent may be a get_weather intent. The get_weather intent may be passed to a weather skill configured to provide audio of the current day's weather forecast. In various examples, contextual data may be used by the NLU to determine the intent based upon input textual data and/or by the skill to determine the appropriate action to take in response to the intent. For example, the location registered in association with the device ID (e.g., Seattle, Wash.) may be provided by the NLU such that the intent generated by the NLU is a get_weather intent for the location "Seattle". The location registered in association with the device ID is an example of first contextual data. Similarly, the weather skill may determine, based on a previous request issued by the device ID or by an IP address associated with the device ID, that the user typically desires the forecast for the subsequent calendar day, based on previous interactions (e.g., previous turns of dialog) with the same device ID. The knowledge that weather requests issuing from the device ID typically request the forecast for the subsequent calendar day may be an example of second contextual data used by the weather skill to provide the best possible output for the user.

In addition to various speech processing components using contextual data, various speech processing components may generate contextual data. For example, a user may utter a spoken request that a particular song be added to a playlist. A music skill may add the song to the playlist. In various examples, an identifier for the song added to the playlist may represent contextual data for the device ID, account ID, IP address, or other entity.

Figure 2:
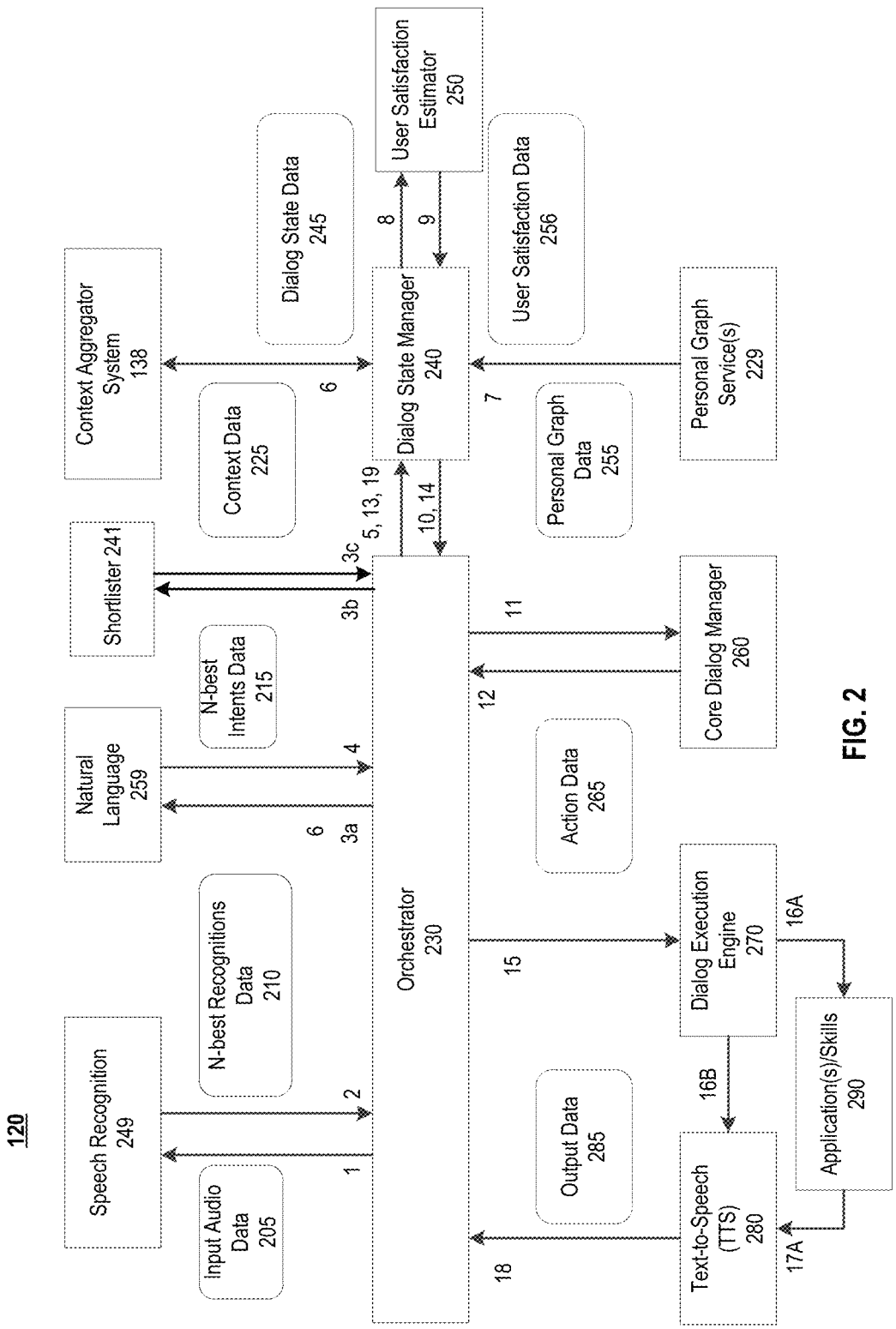
FIG. 2 is a conceptual diagram of components of a speech-processing device(s) according to various embodiments of the present disclosure.

In various examples described herein, contextual data may be stored at a variety of network-accessible locations for retrieval by skills, applications, NLU components, ranker components, and/or other components of the speech-processing architectures described herein (e.g., the speech-processing architecture discussed in reference to FIG. 2). A context service access layer may provide a single access point to contextual data stored by a plurality of contextual data stores (e.g., contextual data store 150). The plurality of contextual data stores together with the context service access layer may be referred to herein as a "context aggregator system". Dedicated hosts and/or dedicated storage within hosts may be provided for various types of contextual data. For example, contextual data related to device identifiers, user account status, user preferences, etc., may each have their own dedicated store for storing contextual data of the relevant type. However, in some cases, contextual data may not be associated with a dedicated store. Such contextual data may be referred to herein as "transient contextual data". Transient contextual data may be generated, for example, through user interaction with a skill and/or by user-initiated dialog. In various other examples, device 110 may store data describing a current state of device 110. For example, device 110 may store data indicating that device 110 is currently in a state of music playback, in a voice call, and/or in a video call. There may not be a dedicated storage for such data. Accordingly, such data may be described as transient contextual data. Device 110 may periodically send current state data to speech processing system 120. An orchestrator of speech processing system 120 may store the contextual data related to the particular device 110 in contextual data store 150 using the various techniques described herein. Another example of transient contextual data may include data related to a particular speech request received by device 110 and sent over network 104 to speech processing system 120. Examples of such data may include timestamps associated with the speech request, an IP address associated with the speech request, a device serial number of the device 110 receiving the speech request, information about a skill responding to the speech request, data indicating user sentiment detected in the speech request, etc. An orchestrator of speech processing system 120 may store such transient contextual data in contextual data store 150 in accordance with the various techniques described herein.

According to various embodiments described herein, the context service access layer may provide a mutable state query language engine effective to provide a mechanism for aggregating and storing transient contextual data. The mutable state query language engine provides a mechanism for managing mutation of state within the context aggregator system so that transient data generated by skills, applications, and/or other contextual data producers may be stored within the context aggregator system without requiring deployment of a dedicated store and without interrupting operation of the context aggregator system. In order to provide a mechanism for managing mutation of state within the context aggregator system, a set of atomic database operations are provided and made accessible through the context service access layer (e.g., through an application programming interface ("API") of the context service access layer). In various examples, a speech processing component (e.g., orchestrator 230 described below in reference to FIG. 2) may communicate with an API of the context aggregator service to determine query language database schema modifications and/or query language directives effective to cause the context aggregator service to automatically generate extensions for operations associated with the directive and/or query language database schema modification. Operations, as described herein, may be executable instructions in a query language of a database effective to modify, write to, and/or read from, one or more fields of the database. Examples of database modifications that may be performed using operations include the examples provided in FIGS. 3B, 3C, 5A-5J as well as operations effective to read from fields, write to fields, perform mathematical operations on (e.g., addition, subtraction, multiplication, etc.) values stored in fields, read and/or write metadata associated with fields (e.g., time stamps and/or revision numbers), determine whether or not values are stored at fields, return Boolean values stored in fields, return list sizes, add to lists, remove from lists, etc. Although a number of operations are described herein for illustrative purposes, a person of ordinary skill in the art will understand that other operations may be used apart from those specifically listed, in accordance with the various embodiments described herein. In some examples, indications of the database operations may be provided through an API of the context aggregator system. The indications of the database operations may be associated with a particular directive exposed by the API. Generally, a database schema (or "schema") refers to a structure of the query language used by a database and describes the objects in the database. The API may expose a schema including a directive that may be used to modify the schema and one or more atomic database operations associated with the directive. When an object type is defined using the schema, the schema may be modified using the directive. The context aggregator system may be effective to automatically generate extensions to the plurality of operations associated with the directive in response to the directive modifying the schema. Additionally, the context aggregator system may automatically generate a database for storing the object of the defined type. Additionally, the mutable state query language engine handles concurrency issues to ensure that concurrent operations result in the expected final modifications to the stored contextual data.

FIG. 1 illustrates a system 100 including a mutation architecture for aggregation of transient contextual data, in accordance with various embodiments of the present disclosure. As shown in FIG. 1, the system 100 includes a computing device 110, a speech processing system 120, a skill 170, and a context aggregator system 138. In various examples, computing device 110 may be configured in communication with the speech processing system 120 over a network 104. Speech processing system 120 may include one or more speech processing devices and/or components, as described in further detail below in reference to FIG. 2. As described in further detail below, network 104 may be, for example, a wide area network, such as the Internet. Speech processing system 120 (which may include one or more different physical devices) may be capable of performing speech processing (e.g., ASR and NLU) as well as non-speech processing operations as described herein. A single computing device may perform all speech processing or multiple computing devices may combine to perform all speech processing.

Context aggregator system 138 may be a service through which speech processing system 120 and/or skill 170 may store and retrieve contextual data. Context aggregator system 138 may have a context service access layer 140 which may provide access to underlying context services 142a, 142b, ..., 142n. Each context service 142a, 142b, ..., 142n may represent one or more hosts (e.g., computing devices including storage for storing contextual data). Each of context services 142a, 142b, ..., 142n may be dedicated to a particular type of contextual data or may be used to store transient contextual data as described herein. Context services 142a, 142b, ... 142n may comprise computer-readable non-transitory storage comprising one or more databases for storing contextual data. Mutable state query language (QL) engine 180 may be software and/or some combination of hardware and software and may provide mutability to a query used to store and/or retrieve contextual data from the underlying context services 142a, 142b, ... 142n through queries executed by context service access layer 140. Mutable state QL engine 180 may provide one or more directives that describe operations that may be added to a query (e.g., a GraphQL query). Directives may be exposed or otherwise made available to speech processing system 120 and to skills (e.g., skill 170) by mutable state QL engine 180. As described in further detail below, skills and/or speech processing system 120 may modify a schema of context aggregator system 138 to add a directive (e.g., @mutable) to automatically provide mutability extensions to the schema. Thereafter, mutability operations may be included in queries directed to the underlying context services 142a, 142b, ..., 142n. Accordingly, the speech processing system 120 and/or third party skills (e.g., skill 170) may store transient contextual data with a mutable state in context aggregator system 138 without the need to write dedicated code.

Context aggregator system 138 may expose a query language (e.g., including a query language schema) to speech processing system 120 and/or skill 170. In a query language such as GraphQL that uses a graph database instead of a relational database, directives may be added to a schema by context aggregator system 138 in order to instruct the query language to automatically generate extensions to add to the schema to support atomic database operations and/or to automatically generate a contextual data store 150. The various operations supported by a particular directive may be defined within context aggregator system 138 and may be published through an API of context aggregator system 138 in order to make the various operations (and the relevant directive(s)) available to publishers of contextual data so that such publishers may store and/or modify the contextual data through the context aggregator system 138 using the various operations. A publisher of contextual data (e.g., orchestrator 230, skill 170, etc.) may thereafter modify a schema of the query language to include the directive in order to have contextual data store 150 automatically generate extensions for the operations associated with the specified directive.

In various examples, modifying the GraphQL schema by adding a directive (e.g., the @mutable directive depicted in FIG. 3A) may automatically add operations (e.g., the operations depicted in FIGS. 3B, 3C, and 5A-5J) that may be used to modify and/or store contextual data within contextual data store 150. In the example depicted in FIG. 3A, the schema 302 includes the field "musicPlaybackQueue". If no directive were added to the schema 302 included in FIG. 3A, a developer would need to provide an implementation of the function musicPlaybackQueue. However, by including the @mutable directive, context aggregator system 138 writes a database for the specified list field (e.g., a database stored in contextual data store 150) and automatically generates a function that returns the list of the specified field (e.g., musicPlaybackQueue). Although, in FIG. 3A, the directive is "@mutable" the directive may be provided with a different name, as desired. The directive may be made available by a schema published by an API of context aggregator system 138. The directive may automatically generate extensions to the schema to support database operations. Examples, of such operations are described below in reference to FIGS. 3B, 3C, and 5A-5J.

In FIG. 1, device 110 may receive audio including a spoken utterance of a user via a microphone (or array of microphones) of the device 110. The device 110 may generate input audio data corresponding to the audio, and may send the input audio data to the speech processing system 120 for processing. Alternatively, device 110 (or another device) may receive text input by the user via either a physical keyboard or virtual keyboard presented on a touch sensitive display of the device 110. The device 110 may generate input text data corresponding to the text, and may send the input text data to the speech processing system 120 for processing.

The speech processing system 120 receives input data from a device 110. If the input data is the input audio data from the device 110, the speech processing system 120 performs speech recognition processing (e.g., ASR) on the input audio data to generate input text data. The speech processing system 120 performs natural language processing on input text data (either received from the device 110 or generated from the input audio data received from the device 110) to determine a user command. In various examples, the natural language processing may use contextual data provided by context aggregator system 138. In some further examples, the natural language processing may produce contextual data that may then be stored in context aggregator system 138. Some examples of contextual data may include preceding utterance (e.g., an utterance from a previous turn of dialog), previous speech processing system response, on-screen entities, connected devices, user preferences, device identifiers, etc. A user command may correspond to a user request for the system to output content to the user. The requested content to be output may correspond to music, video, search results, weather information, etc.

The speech processing system 120 determines output content responsive to the user command. The output content may be received from a first party (1P) application (e.g., an application controlled or managed by the voice service speech processing system 120 or by the company or entity controlling the speech processing system 120) or a third party (3P) application (e.g., an application managed by another application computing device(s) in communication with the speech processing system 120 but not controlled or managed by the speech processing system 120 or by the entity controlling the speech processing system 120). In various examples, the speech processing system 120 and/or the skill generating the output content may consume contextual data to determine the output content. Similarly, in various examples, the speech processing system 120 and/or the skill may generate new contextual data during the interaction with the user and may store such contextual data in context aggregator system 138 using context service access layer 140. Mutable state QL engine 180 may expose a number of different atomic operations that may be used by a skill (e.g., skill 170) and/or by speech processing system 120 to store transient contextual data within context aggregator system 138, even when no dedicated store currently exists for the particular contextual data. For example, in response to adding a directive to a schema, mutability operation extensions may be automatically generated and a dedicated storage may be provided (e.g., contextual data store 150) by mutable state QL engine 180. The schema modifications (e.g., the @mutable directive) and/or the mutability operations may be exposed by mutable state QL engine 180 for use by speech processing system 120 and/or skill 170 to store transient contextual data.

The speech processing system 120 sends back to the initiating device (110) output data including the output content responsive to the user command. The device (110) may emit the output data as audio, present the output data on a display, or perform some other operation responsive to the user command. The speech processing system 120 may determine output content responsive to the user command by performing an action. For example, in response to the user command, the speech processing system 120 may determine one or more actions that correspond to the user command and may select one of the actions to perform. Examples of actions include launching an application (e.g., sending dialog data or other data to a specific application to be processed, which may correspond to a dispatch request), performing disambiguation (e.g., determining that the speech processing system 120 doesn't have enough information to execute a command and generating a dialog request that requests additional information from the user), confirming the action with a user (e.g., generating audio data and/or display data indicating the action to be performed and requesting confirmation from the user), displaying information to the user (e.g., generating display data in response to the user command, such as displaying a second page of content), playing audio information for the user (e.g., generating audio data in response to the user command, such as indicating that the application is being launched, that a volume has been changed, and/or the like), or the like.

The speech processing system may operate using various components as illustrated in and described with respect to FIG. 2. The various components illustrated in FIG. 2 may be located on a same or different physical device. Communication between various components illustrated in FIG. 2 may occur directly or across a network(s) 104.

An audio capture component, such as a microphone or array of microphones of a device 110, captures the input audio corresponding to a spoken utterance. The device 110, using a wakeword detection component, processes audio data comprising a digital representation of the input audio to determine if a keyword (e.g., a wakeword) is detected in the audio data. Following detection of a wakeword, the device 110 sends the audio data corresponding to the utterance to a speech processing system 120 for processing.

Upon receipt by the speech processing system 120, the audio data may be sent to an orchestrator 230. The orchestrator 230 may include memory and logic that enable the orchestrator 230 to transmit various pieces and forms of data to various components of the system.

In general, upon receipt of input audio data 205, the orchestrator 230 sends the input audio data 205 to a speech recognition component 249. Speech recognition component 249 may transcribe the audio data into text data representing words of speech contained in the audio data. The speech recognition component 249 interprets the spoken utterance based on a similarity between the spoken utterance and pre-established language models. For example, the speech recognition component 249 may compare the audio data with models for sounds (e.g., subword units or phonemes) and sequences of sounds to identify words that match the sequence of sounds spoken in the utterance of the audio data.

In various examples, orchestrator 230 may send the results of speech recognition processing (e.g., text data representing speech) to shortlister component 241. Shortlister component 241 may use machine learning techniques to determine a set of probabilities that the user utterance is intended to invoke each application of a set of applications for which the shortlister component 241 has been trained. Each probability represents a likelihood that the particular application is appropriate to process the utterance. Thereafter, in some examples, the shortlister component 241, orchestrator 230, natural language component 259 (e.g., a natural language understanding component), and/or another processing component of speech processing system 120, may determine a subset of the applications for which the utterance is appropriate by ranking or otherwise sorting the applications based on the determined probabilities for each application. The subset of applications and/or the probabilities generated by shortlister component 241 may be provided to the natural language component 259 to reduce the computational load of the natural language component 259 when determining an appropriate application to process the utterance. As described in further detail below, the natural language component 259 may generate N-best Intents data 215 representing an N-best list of the top scoring intents associated with the utterance (as received by the speech processing system 120 as either a spoken utterance or textual input) to the orchestrator 230 based on the subset of applications and/or the application-specific probabilities determined by shortlister component 241.

Results of speech recognition processing (e.g., text data representing speech) are processed by a natural language component 259 of the speech-processing system 120. The natural language component 259 attempts to make a semantic interpretation of the text data. That is, the natural language component 259 determines the meaning behind the text data based on the individual words in the text data and then implements that meaning. As previously described, the natural language component 259 may use contextual data along with the text data representing speech to generate a semantic representation of the input text. The natural language component 259 interprets a text string to derive an intent or a desired action from the user as well as the pertinent pieces of information in the text data that allow a device (e.g., the device 110, the speech processing system 120, etc.) to complete that action. For example, if a spoken utterance is processed using the speech recognition component 249, which outputs the text data "call mom", the natural language component 259 may determine the user intended to activate a telephone in his/her device and to initiate a call with a contact matching the entity "mom."

The natural language component 259 may be configured to determine a "domain" of the utterance so as to determine and narrow down which services offered by an endpoint device (e.g., the speech processing system 120 or the device 110) may be relevant. For example, an endpoint device may offer services relating to interactions with a telephone service, a contact list service, a calendar/scheduling service, a music player service, etc. Words in a single textual interpretation may implicate more than one service, and some services may be functionally linked (e.g., both a telephone service and a calendar service may utilize data from a contact list). In various examples, a domain may be associated with a set of applications. In various examples, some applications may be specific to a particular domain. In some examples, other applications may be applicable to multiple domains.

In an example, if a spoken utterance is processed using the speech recognition component 249, which outputs the text data "Computer, play white fang", the natural language component 259 may determine the user most likely intended to activate the "play movie" intent of a Movies domain, the "play audiobook" intent of an Audiobook domain, or the "play music" intent of a Music domain. As described in further detail below, slot analysis and/or named entity recognition may be used to determine that "white fang" corresponds to the title of a movie, the title of an audiobook, and/or the title of a song or artist associated with the Music domain.

In various examples, speech processing techniques may determine a confidence score (sometimes referred to herein as a "confidence value") for each of the identified intents (e.g., the "play movie", "play audiobook", and "play music" intents). In some examples, a ranker component may be used to rank the determined intents based on user and/or device data. Speech processing systems may send the intent associated with the highest rank to an application effective to execute the intent. Traditionally, data representing the other intents (e.g., intents/domains other than the highest ranked intent/domain) is not stored by the speech processing system. Accordingly, in traditional speech processing systems, if the user's intention does not match with the system-selected domain/intent, the user may be required to request that the system stop and may rephrase the request. Such a scenario requires an additional call to natural language component 259 as well as to the ranker component to generate an additional ranked list. Additionally, requiring the user to rephrase the request may result in user frustration and a diminished user experience.

In various examples, the natural language component 259 may include a recognizer that includes a named entity resolution (NER) component configured to parse and tag to annotate text as part of natural language processing. For example, for the text "call mom," "call" may be tagged as a command to execute a phone call and "mom" may be tagged as a specific entity and target of the command. Moreover, the telephone number for the entity corresponding to "mom" stored in a contact list may be included in the NLU results. Further, the natural language component 259 may be used to provide answer data in response to queries, for example using a natural language knowledge base.

In natural language processing, a domain may represent a discrete set of activities having a common theme, such as "shopping," "music,", "movie", "calendaring," "communications," etc. As such, each domain may be associated with a particular recognizer, language model and/or grammar database, a particular set of intents/actions, and a particular personalized lexicon. Each gazetteer may include domain-indexed lexical information associated with a particular user and/or device. A user's music-domain lexical information (e.g., a gazetteer associated with the user for a music domain) might correspond to album titles, artist names, and song names, for example, whereas a user's contact-list lexical information (e.g., a gazetteer associated with the user for a contact domain) might include the names of contacts. Since every user's music collection and contact list is presumably different, this personalized information improves entity resolution. A lexicon may represent what particular data for a domain is associated with a particular user. The form of the lexicon for a particular domain may be a data structure, such as a gazetteer. A gazetteer may be represented as vector data with many bit values, where each bit indicates whether a data point associated with the bit is associated with a particular user. For example, a music gazetteer may include one or more long vectors, each representing a particular group of musical items (such as albums, songs, artists, etc.) where the vector includes positive bit values for musical items that belong in the user's approved music list. Thus, for a song gazetteer, each bit may be associated with a particular song, and for a particular user's song gazetteer the bit value may be 1 if the song is in the particular user's music list. Other data structure forms for gazetteers or other lexicons are also possible.

As noted above, in traditional natural language processing, text data may be processed applying the rules, models, and information applicable to each identified domain. For example, if text represented in text data potentially implicates both communications and music, the text data may, substantially in parallel, be natural language processed using the grammar models and lexical information for communications, and natural language processed using the grammar models and lexical information for music. The responses based on the text data produced by each set of models is scored, with the overall highest ranked result from all applied domains being ordinarily selected to be the correct result. The shortlister component 241 may reduce the computational burden of the natural language component 259 by processing the text data based on the application-specific probabilities determined by shortlister component 241. For example, natural language processing by the natural language component 259 may be performed for the n applications having the highest probabilities that the application is programmed to process and/or respond to the user utterance and/or the text data.

A downstream process called named entity resolution may link a text portion to an actual specific entity known to the system. To perform named entity resolution, the system may utilize gazetteer information stored in an entity library storage. The gazetteer information may be used for entity resolution, for example matching speech recognition results with different entities (e.g., song titles, contact names, etc.). Gazetteers may be linked to users (e.g., a particular gazetteer may be associated with a specific user's music collection), may be linked to certain domains (e.g., shopping, music, communications), or may be organized in a variety of other ways. The NER component may also determine whether a word refers to an entity that is not explicitly mentioned in the text data, for example "him," "her," "it" or other anaphora, exophora or the like.

A recognizer of the natural language component 259 may also include an intent classification (IC) component that processes text data to determine an intent(s), where the intent(s) corresponds to the action to be performed that is responsive to the user command represented in the text data. Each recognizer is associated with a database of words linked to intents. For example, a music intent database may link words and phrases such as "quiet," "volume off," and "mute" to a "mute" intent. The IC component identifies potential intents by comparing words in the text data to the words and phrases in the intents database. Traditionally, the IC component determines using a set of rules or templates that are processed against the incoming text data to identify a matching intent.

In order to generate a particular interpreted response, the NER component applies the grammar models and lexical information associated with the respective recognizer to recognize a mention of one or more entities in the text represented in the text data. In this manner the NER component identifies "slots" (i.e., particular words in text data) that may be needed for later command processing. Depending on the complexity of the NER component, it may also label each slot with a type (e.g., noun, place, city, artist name, song name, or the like). Each grammar model includes the names of entities (i.e., nouns) commonly found in speech about the particular domain (i.e., generic terms), whereas the lexical information from the gazetteer is personalized to the user(s) and/or the device. For instance, a grammar model associated with the shopping domain may include a database of words commonly used when people discuss shopping.

The intents identified by the IC component are linked to domain-specific grammar frameworks with "slots" or "fields" to be filled. Each slot/field corresponds to a portion of the text data that the system believes corresponds to an entity. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags.

For example, the NER component may parse the text data to identify words as subject, object, verb, preposition, etc., based on grammar rules and/or models, prior to recognizing named entities. The identified verb may be used by the IC component to identify intent, which is then used by the NER component to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER component then searches the corresponding fields in the domain-specific and personalized lexicon(s), attempting to match words and phrases in the text data tagged as a grammatical object or object modifier with those identified in the database(s). As used herein, "intent data" may correspond to the intent itself, framework(s) for the intent, slot(s)/field(s) corresponding to the intent, object modifier(s), any information associated with the intent/framework(s)/slot(s), or any combination thereof without departing from the disclosure.

To illustrate an example, a command of "book me a plane ticket from Boston to Seattle for July 5" may be associated with a <BookPlaneTicket> intent. The <BookPlaneTicket> intent may be associated with a framework including various slots including, for example, <DepartureDate>, <DepartureLocation>, <ArrivalDate>, and <DestinationLocation>. In the above example, the speech processing system 120, namely the natural language component 259, may populate the framework as follows: <DepartureDate: July 5>, <DepartureLocation: Boston>, <ArrivalDate: July 5>, and <DestinationLocation: Seattle>.

This process includes semantic tagging, which is the labeling of a word or combination of words according to their type/semantic meaning. Parsing may be performed using heuristic grammar rules, or the NER component may be constructed using techniques such as Hidden Markov models (HMMs), maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC component will determine corresponds to the "play music" intent. Additionally, in at least some examples, probability data generated by shortlister component 241 may indicate a high likelihood that the "play music" intent is appropriate as the highest probability applications for the user utterance correspond to music applications. At this stage, no determination has been made as to the meaning of "mother's little helper" and "the rolling stones," but based on grammar rules and models, it is determined that the text of these phrases relate to the grammatical object (i.e., entity) of the text data.

The frameworks linked to the intent are then used to determine what database fields should be searched to determine the meaning of these phrases, such as searching a user's gazette for similarity with the framework slots. So a framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER component may search a database of generic words associated with the domain. For example, if the text data corresponds to "play songs by the rolling stones," after failing to determine an album name or song name called "songs" by "the rolling stones," the NER component may search the domain vocabulary for the word "songs." In the alternative, generic words may be checked before the gazetteer information, or both may be tried, potentially producing two different results.

The results of natural language processing may be tagged to attribute meaning to the text data. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The results of natural language processing may be sent to an application 290, which may be located on a same or separate computing device as part of a system. The system may include more than one application 290, and the destination application 290 may be determined based on the natural language processing results and may be selected from the subset of applications determined by shortlister component 241 and/or by another component of speech processing system 120 based on the probabilities determined by shortlister component 241. For example, if the natural language processing results include a command to play music, the destination application 290 may be a music playing application, such as one located on the device 110 or in a music playing appliance, configured to execute a music playing command. If the natural language processing results include a search request (e.g., requesting the return of search results), the application 290 selected may include a search engine application, such as one located on a search server, configured to execute a search command and determine search results, which may include output text data to be processed by a text-to-speech engine and output from a device as synthesized speech.

The speech processing system 120 may include a user recognition component. The user recognition component may take as input the audio data as well as the text data output by the speech recognition component 249. The user recognition component may receive the text data from the speech recognition component 249 either directly or indirectly via the orchestrator 230. Alternatively, the user recognition component may be implemented as part of the speech recognition component 249. The user recognition component determines respective scores indicating whether the utterance in the audio data was spoken by particular users. The user recognition component also determines an overall confidence regarding the accuracy of user recognition operations. User recognition may involve comparing speech characteristics in the audio data to stored speech characteristics of users. User recognition may also involve comparing biometric data (e.g., fingerprint data, iris data, etc.) received by the user recognition component to stored biometric data of users. User recognition may further involve comparing image data including a representation of at least a feature of a user with stored image data including representations of features of users. It should be appreciated that other kinds of user recognition processes, including those known in the art, may be used. Output of the user recognition component may be used to inform natural language processing as well as processing performed by 1P and 3P applications 290.

The speech processing system 120 may additionally include a user profile storage. The user profile storage may include data regarding user accounts. The user profile storage may be implemented as part of the speech processing system 120. However, it should be appreciated that the user profile storage may be located proximate to the speech processing system 120, or may otherwise be in communication with the speech processing system 120, for example over the network(s) 104. The user profile storage may include a variety of information related to individual users, accounts, etc. that interact with the system.

FIG. 2 illustrates a 1P application 290 of the system. However, it should be appreciated that the data sent to a 1P application 290 may also, or instead, be sent to 3P application computing device(s) executing 3P applications.

Application, as used herein, may be considered synonymous with a skill. A "skill" may correspond to a domain and may be software running on a speech processing system 120 and akin to an application. That is, a skill may enable a speech processing system 120 or other application computing device(s) to execute specific functionality in order to provide data or produce some other output called for by a user. The system may be configured with more than one skill. For example a weather service skill may enable the speech processing system 120 to execute a command with respect to a weather service computing device(s), a car service skill may enable the speech processing system 120 to execute a command with respect to a taxi service computing device(s), an order pizza skill may enable the speech processing system 120 to execute a command with respect to a restaurant computing device(s), etc.

While the examples illustrated above describe discrete skills associated with a specific service, the disclosure is not limited thereto and an application (e.g., skill) may be associated with specific and/or general functions, including system functions associated with the speech processing system 120. For example, the speech recognition component 249, the shortlister component 241, the natural language component 259, or the like may correspond to an application running on the speech processing system 120 (e.g., the speech processing system 120 sends input data to the application and the application generates output data). In general, an application or a skill may refer to a system process running on the speech processing system 120, a first party application running on the speech processing system 120, a third party application running on the speech processing system 120, and/or the like without departing from the disclosure.

Output of the application/skill 290 may be in the form of text data to be conveyed to a user. As such, the application/skill output text data may be sent to a text-to-speech (TTS) component 280 either directly or indirectly via the orchestrator 230. The TTS component 280 may synthesize speech corresponding to the received text data. Speech audio data synthesized by the TTS component 280 may be sent to a device 110 for output to a user.

The TTS component 280 may perform speech synthesis using one or more different methods. In one method of synthesis called unit selection, the TTS component 280 matches the text data or a derivative thereof against a database of recorded speech. Matching units are selected and concatenated together to form speech audio data. In another method of synthesis called parametric synthesis, the TTS component 280 varies parameters such as frequency, volume, and noise to create an artificial speech waveform output. Parametric synthesis uses a computerized voice generator, sometimes called a vocoder.

The speech processing system 120 may further operate using various components as illustrated in and described with respect to FIG. 2. The speech recognition component 249 receives [1] input audio data 205 from the orchestrator 230. The speech recognition component 249 processes the input audio data 205 to generate an N-best list of text possibly representing an utterance in the input audio data 205. The speech recognition component 249 outputs [2] N-best recognitions data 210, including text representing the generated N-best recognitions, to the orchestrator 230.

Shortlister component 241 may receive [3b] the N-best recognitions data 210 from the orchestrator 230. Shortlister component 241 may be trained using a set of applications (or "skills"). As described in further detail below, for each application in the set of applications, shortlister component 241 may determine a probability (e.g., a score) that the application is applicable to generate a response to the utterance. Shortlister component 241 may send [3c] the subset of applications and/or the determined probabilities to orchestrator 230. In various examples, to the extent that the natural language component 259, the dialog state manager 240, the core dialog manager 260, and/or other components of speech processing system 120 select an application to process the utterance (and/or input text), the natural language component 259, the dialog state manager 240, the core dialog manager 260, and/or other components of speech processing system 120 may select the application from the subset of applications and/or based on the probabilities determined by shortlister component 241.

The natural language component 259 receives [3a] the N-best recognitions data 210, the application-specific probabilities determined by shortlister component 241, and/or the subset of applications determined by shortlister component 241 or by some other processing unit from the orchestrator 230. The natural language component 259 processes the N-best recognitions data 210, the application-specific probabilities, and/or the subset of applications to determine one or more domains of the speech processing system 120 for the utterance. Each domain may be associated with a separate recognizer implemented within the natural language component 259. A recognizer may include an NER component and an IC component as described above. The natural language component 259 outputs [4] N-best intents data 215, representing an N-best list of the top scoring intents associated with the utterance (as received by the speech processing system 120 as either a spoken utterance or textual input) to the orchestrator 230. Additionally, the orchestrator 230 may send [5] the input audio data 205, the N-best recognitions data 210, the N-best intents data 215, the subset of applications, the application-specific probabilities determined by shortlister component 241, additional data, and/or any combination thereof to the dialog state manager 240.

The speech processing system 120 may be configured in communication with context aggregator system 138 (although, in FIG. 2, context aggregator system 138 is depicted as a one of the components of the speech processing system, for purposes of illustration). A context aggregator system 138 may be configured to output non-user specific contextual data, such as temporal information (e.g., time of day). A context aggregator system 138 may also be configured to output metadata associated with the device from which the user command was received. Examples of device metadata may include the type of device (e.g., car, phone, speaker, etc.), a state of the device (e.g., in music playback, in voice call, in video call, etc.), an identifier of a spoken request (e.g., a user utterance) received by the device, or the like. A context aggregator system 138 may further be configured to output data indicating previously received user commands and their determined intents. The context aggregator system 138 may store and provide access to contextual data 225, which may include information about the dialog context and/or other information. Thus, FIG. 2 illustrates the context aggregator system 138 sending [6] the contextual data 225 to the dialog state manager 240. However, the disclosure is not limited thereto and the context aggregator system 138 may send the contextual data 225 to the dialog state manager 240, the natural language component 259, a ranker component, and/or the orchestrator 230 without departing from the disclosure.

In some examples, the context aggregator system 138 may include additional information relevant to applications and/or intents. For example, the context aggregator system 138 may include information about application ratings (e.g., 5 star rating for a first application and a 4 star rating for a second application), enabling the speech processing system 120 to differentiate between similar applications based on ratings. Additionally or alternatively, the context aggregator system 138 may have location information associated with applications, enabling the speech processing system 120 to select the first application in a first location and the second application in a second location. For example, the first application (e.g., Skill A corresponding to a first transportation company) may not have availability in certain cities, while the second application (e.g., Skill B, corresponding to a second transportation company) has availability, so the speech processing system 120 may select the second application when the user requests a cab in locations that the first application lacks coverage. Similarly, the context aggregator system 138 may include information about context of a user request, enabling the speech processing system 120 to select a first application based on a first user request but select a second application based on a second user request. For example, a first user request (e.g., "What is the weather?") may result in the speech processing system 120 choosing a first application (e.g., Weather skill), whereas a second user request (e.g., "What is the wind?") may result in the speech processing system 120 choosing a second application (e.g., PredictWind skill), despite the similarity in the user requests.

As described in further detail below, context aggregator system 138 may use a query language and may expose (e.g., through an API) one or more directives of the query language schema to the speech processing system 120. Adding the directive to the schema by the speech processing system 120 may cause context aggregator system 138 to automatically generate extensions to the schema to schema to support database operations. The operations may enable the speech processing system 120 to provide mutable state to transient contextual data and to store such contextual data in a data store automatically provided by context aggregator system 138 (e.g., contextual data store 150 of FIG. 1), even when no dedicated store previously existed for the transient contextual data. Additionally, context aggregator system 138 may expose one or more directives of the query language schema to one or more skills so that the skills may store transient contextual data generated by the skill.

The speech processing system 120 may additionally include one or more personal graph services 229. A personal graph service 229 may track user interactions with the system 100 and store previous interactions, user preferences and/or other user-specific information used to build a user profile. Thus, the personal graph services 229 may generate personal graph data 255 and may send [7] the personal graph data to the dialog state manager 240 to include in the dialog state. In some examples, the personal graph data includes information specific to the current dialog state. For example, if the user request indicates that the user would like to request a ride, the personal graph data may indicate a first number of times that the user has used a first application (e.g., Skill A) and a second number of times that the user has used a second application (e.g., Skill B). This information is specific to the user but also relevant to the current dialog state. However, the disclosure is not limited thereto and the personal graph data may include additional information without departing from the disclosure.

While the abovementioned examples illustrate the personal graph service 229 being tailored to a specific user, the disclosure is not limited thereto. In some examples, the personal graph service 229 may provide information according to different hierarchies. As discussed above, the personal graph service 229 may provide profile data on a user level (e.g., based on a system interaction history specific to a user ID associated with a user from which the current command originated). In addition, the personal graph service 229 may alternatively provide profile data on a device level (e.g., based on a system interaction history specific to a device ID associated with the device from which data corresponding to the current command was received). Additionally or alternatively, the personal graph service 229 may provide profile data on a user and device level (e.g., based on a system interaction history specific to a user ID as well as a device ID).

The dialog state manager 240 may receive [5] various inputs from the orchestrator 230, such as the input audio data 205, the N-best recognitions data 210, the subset of applications and/or the application probabilities determined by shortlister component 241, and/or the N-best intents data 215. In addition, the dialog state manager 240 may receive [6] the contextual data 225 from the context aggregator system 138 and may receive [7] the personal graph data from the personal graph service 229. The dialog state manager 240 may generate dialog state data 245, including all of the data received that is associated with a current exchange with the user. The dialog state manager 240 may send [8] the dialog state to the user satisfaction estimator 250.

The user satisfaction estimator 250 may receive [8] the dialog state data 245 and may generate user satisfaction data 256, which may be a scalar value (e.g., between 1 and 5) that corresponds to an estimate of user satisfaction at a particular point in time. The user satisfaction estimator 250 may send [9] the user satisfaction data 256 to the dialog state manager 240 and the dialog state manager 240 may update the dialog state data 245 to include the user satisfaction data 256.

The dialog state manager 240 may send [10] the dialog state data 245 to the orchestrator 230 and/or the core dialog manager 260. Additionally or alternatively, the orchestrator 230 may send [11] the updated dialog state to the core dialog manager 260. The core dialog manager 260 may use rule-based candidate generators and/or machine learning candidate generators (e.g., Deep Neural Network (DNN) generators) to generate candidate actions and/or applications based on the dialog state data 245 and may use rule-based selectors and/or machine learning selectors (e.g., DNN selectors) to select a single action from the candidate actions. Similarly, the core dialog manager 260 may use rule-based candidate selectors and/or machine learning candidate selectors (e.g., DNN selectors) to select a single application from the candidate applications to perform the action. The core dialog manager 260 may generate action data 265 that indicates the selected action, which may correspond to a dialog request or a dispatch request, and may send [12] the action data 265 to the orchestrator 230 and/or the dialog state manager 240 (e.g., via the orchestrator 230).

The dialog state manager 240 may receive [13] the action data 265 and may update the dialog state data 245 again to include the action data 265. The dialog state manager 240 may send [14] the updated dialog state data 245 to the orchestrator 230, which may send [15] the updated dialog state data 245 to a dialog execution engine 270. The dialog execution engine 270 may receive [15] the updated dialog state data 245, including the action data 265, and may determine whether the action data 265 indicates that the dialog execution engine 270 should dispatch the action to an application (e.g., dispatch request) or to generate a prompt requesting additional information from the user (e.g., dialog request). For example, if the action data 265 includes a dispatch request, the dialog execution engine 270 may send [16A] the action data 265 and/or the dialog state data 245 to the application 290 specified by the action data 265. The application 290 may use rule-based action generators to generate candidate actions based on the dialog state data 245 and may use rule-based selectors and/or machine learning selectors (e.g., DNN selectors) to select a single action from the candidate actions. The application 290 may generate a prompt corresponding to the selected action and may generate an updated dialog state, which may be sent [17A] to the TTS component 280.

In contrast, if the action data 265 includes a dialog request, the dialog execution engine 270 may generate a prompt soliciting additional information from the user and may send [16B] the prompt and/or the dialog state data 245 to the TTS component 280. The solicitation may take the form of text output via a display of a user device or audio output by a speaker of a user device. Accordingly, if the solicitation to the user is to be audio, the TTS component 280 may generate output data 285 that includes output audio data based on the text data of the prompt. If the solicitation to the user does not include audio, the TTS component 280 may generate output data 285 that only includes the text data of the prompt. The TTS component 280 may send [18] the output data 285 and/or additional data received from the dialog execution engine 270 or the application 290 to the orchestrator 230 and the orchestrator 230 may send [19] the output data 285 and/or the additional data to the dialog state manager 240, which may update the dialog state data 245 again.

In some examples, the core dialog manager 260 may determine that the dialog state data 245 includes enough information to select an action and generate a dispatch request to dispatch the selected action and/or dialog state to the selected application. For example, in response to a user request to "book me a cab to Favorite Bar," the core dialog manager 260 may determine that the intent is to book a cab (e.g., GetCabIntent) and may generate candidate actions associated with booking a cab, such as a first action using a first application (e.g., Skill A) and a second action using a second application (e.g., Skill B). In various examples, Skill A and Skill B may be included in a subset of applications determined by shortlister component 241 for the utterance "book me a cab to Favorite Bar". In various other examples, the probabilities that Skill A and Skill B are appropriate applications to process the utterance "book me a cab to Favorite Bar" may exceed a probability threshold. In still other examples, the probabilities that Skill A and Skill B are appropriate applications to process the utterance "book me a cab to Favorite Bar" may be among the highest probabilities determined by shortlister component 241 for the set of skills for which shortlister component 241 has been trained. The core dialog manager 260 may communicate with the first application and/or the second application to acquire more information, such as whether cars are available (e.g., Skill A indicates that no cars are available for 30 minutes, whereas Skill B indicates that a car is available within 5 minutes). Based on the dialog state data 245 and the additional information, the core dialog manager 260 may select the second action and generate a dispatch command, with the action data 265 indicating that the system 100 should dispatch the second action to the second application.

In some examples, dispatching the second action to the second application corresponds to sending the second action (e.g., Dispatch(Skill B: GetCabIntent(Current location: 2121 7$^{th}$ Avenue Seattle, Destination: Favorite Bar)) to the second application for execution. However, the second action is determined by the core dialog manager 260 processing the dialog state data 245 and the core dialog manager 260 is not specifically trained for intents/actions associated with the second application. Therefore, dispatching the second action to the second application may instead correspond to updating the dialog state data 245 with the second action and/or any additional information and sending the dialog state data 245 to the second application for further processing. For example, the core dialog manager 260 may send the selected action (e.g., Dispatch(Skill B: GetCabIntent(Current location: 2121 7$^{th}$ Avenue Seattle, Destination: Favorite Bar)), the additional information (e.g., Skill A indicates that cars are not available for 30 minutes, Skill B indicates that cars are available within 5 minutes) and/or any other information (e.g., Reason: Skill A outage) to the dialog state manager 240, the dialog state manager 240 may update the dialog state data 245 accordingly and the updated dialog state data 245 may be sent to the second application.

While the examples described above illustrate the second action including an intent (e.g., Dispatch(Skill B: GetCabIntent)), the disclosure is not limited thereto and the second action may only correspond to dispatching to the second application (e.g., Dispatch(Skill B)). Thus, the core dialog manager 260 may generate candidate actions corresponding to a specific intent associated with a specific application, or the candidate actions may correspond to a specific application regardless of intent. To illustrate an example of the candidate actions including specific intents, the core dialog manager 260 may generate Dispatch(Skill B: GetCabIntent), Dispatch(Skill B: ViewNearbyCabsIntent), Dispatch(Skill A: GetCabIntent), Dispatch(Skill A: ViewNearbyCabsIntent), etc. and selecting a single action indicates both the application (e.g., Skill A or Skill B) and the intent (e.g., GetCabIntent or ViewNearbyCabsIntent). Thus, selecting the candidate action corresponds to selecting an intent associated with a specific application, which may assist the core dialog manager 260 in selecting between different applications. Additionally or alternatively, the core dialog manager 260 may generate candidate actions based on available applications, regardless of intent. For example, the core dialog manager 260 may generate Dispatch(Skill A), Dispatch(Skill B), etc. and selecting a single action indicates the application to which to dispatch the dialog state data 245. Thus, selecting the candidate action corresponds to sending the dialog state data 245 to the specific application (e.g., Skill B) and the application determines the intent. Additionally or alternatively, the core dialog manager 260 may generate candidate actions based on the application probabilities determined by shortlister component 241 and included in dialog state data 245.

In some examples, the core dialog manager 260 may determine that the dialog state data 245 does not include enough information to select an action and generate a dispatch command to dispatch the selected action and/or dialog state to a corresponding application. Instead, the core dialog manager 260 may determine that additional information is needed from the user and may generate a dialog request to solicit the user for the additional information. For example, if the core dialog manager 260 determines one or more intents/actions that may correspond to the speech, but none of the intents/actions are associated with a confidence value meeting or exceeding a threshold value, the core dialog manager 260 may generate a dialog request that requests additional information. While the core dialog manager 260 may dispatch an action despite the confidence score being below the threshold value, a lower confidence score corresponds to an increased likelihood that the selected action is not what the user intended. Thus, dispatching the action may result in performing a command that is different than the user requested, resulting in a lower user satisfaction value after the command is executed.

In order to increase the likelihood that the action selected by the core dialog manager 260 corresponds to the user request, the core dialog manager 260 may generate a dialog request requesting additional information and/or clarification from the user. For example, in response to a request to "book a flight to Portland," the core dialog manager 260 may generate a dialog request and the speech processing system 120 may solicit the user as to whether Portland corresponds to Portland, Oreg. or Portland, Me. (e.g., "Would you like to fly to Portland, Oregon, or to Portland, Maine?"). For example, the action data 265 may include the dialog request and the dialog execution engine 270 may interpret the action data 265 to generate a prompt corresponding to the solicitation. As discussed above, the solicitation may take the form of text output via a display of a user device or audio output by a speaker of a user device. In addition, the solicitation may be output by a device different from the device that received the speech. For example, the first device 110a may generate the input audio data but the second device 110b may output the solicitation to the user. Accordingly, if the solicitation to the user is to be audio, the TTS component 280 may generate output audio data based on the text data of the prompt and the second device 110b may output audio corresponding to the output audio data.

While FIG. 2 illustrates specific routing between components, this is intended to illustrate a single example and the disclosure is not limited thereto. For example, FIG. 2 illustrates the action data 265 being sent from the core dialog manager 260 to the orchestrator 230 and from the orchestrator 230 to the dialog state manager 240, and updated dialog data (including the action data 265) being sent from the dialog state manager 240 to the orchestrator 230, from the orchestrator 230 to the dialog execution engine 270, and from the dialog execution engine 270 to the application 290. However, the disclosure is not limited thereto and the dialog data can be routed to any of the components illustrated in FIG. 2 without departing from the disclosure. Thus, any decision making performed by any component in the system 100 may be performed using information (e.g., dialog state data 245) stored in the dialog state manager 240 without departing from the disclosure.

While FIG. 2 illustrates the core dialog manager 260 as a discrete component configured to make decisions for the system 100, and the example described above illustrates the core dialog manager 260 assisting other components in making decisions, the disclosure is not limited thereto. Instead, the core dialog manager 260 may be completely decentralized and individual components may include machine learning models that enable the component(s) to make decisions and optimize user satisfaction over time (collectively, the machine learning models may correspond to the core dialog manager 260). Thus, the core dialog manager 260 may be illustrated as a single component, as a separate component while also being included within individual components, or only within individual components (e.g., without a separate block receiving [11] dialog data and sending [12] action data) without departing from the disclosure.

Figure 3A:
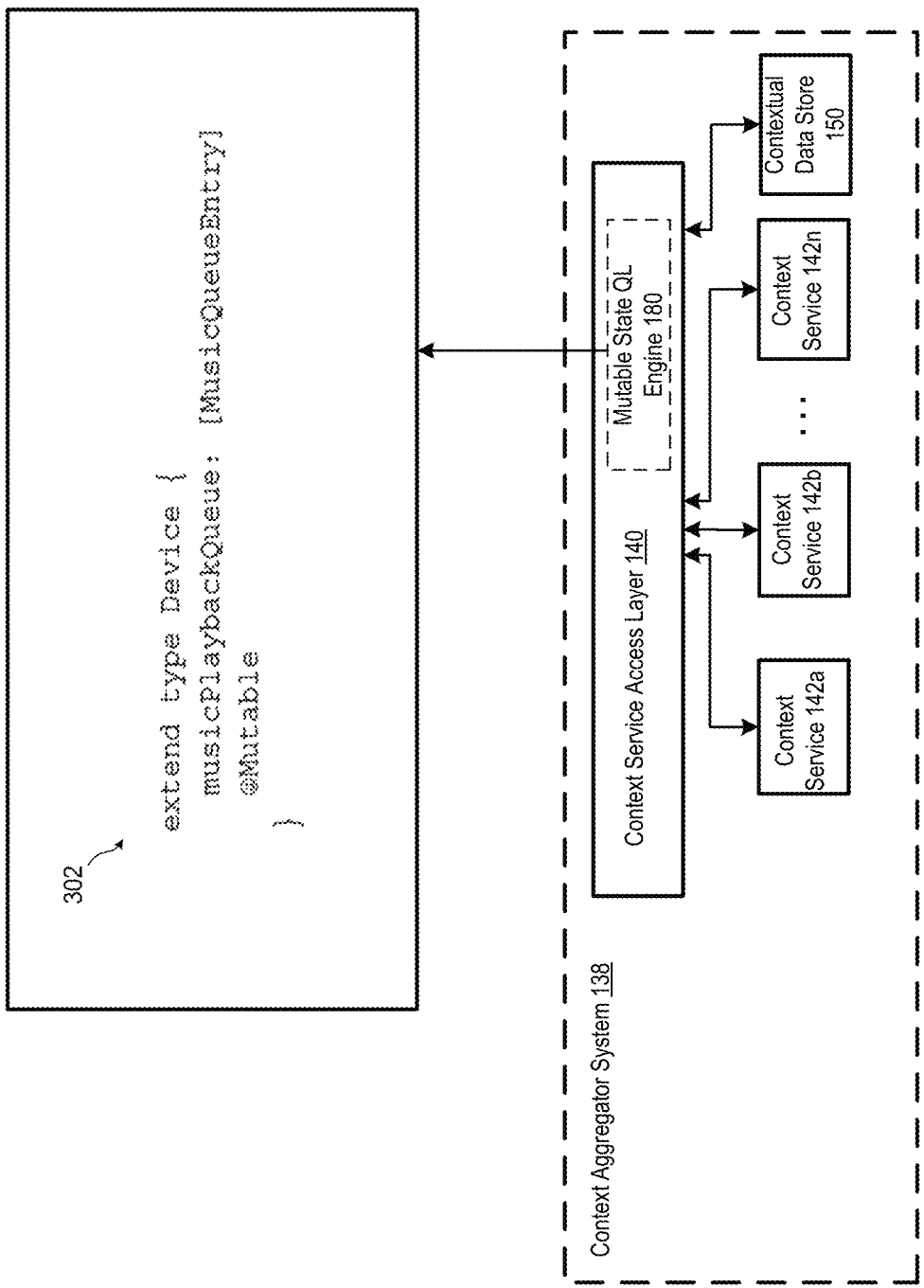
FIG. 3A depicts an example of a definition of an object type of a query language, in accordance with various embodiments described herein.

FIG. 3A depicts an example schema 302 defining an object extend type "Device". In various examples, a developer of a skill or other speech processing component may define a mutable object type and/or field for contextual data that the developer is interested in storing in context aggregator system 138.

In the example depicted in FIG. 3A, the schema 302 includes the directive "@Mutable" indicating that the preceding field "musicPlaybackQueue" is mutable. The mutable field "musicPlaybackQueue" may be mutated using operations automatically generated by the context aggregator system 138 in response to the addition of the @mutable directive to schema 302. In various examples, a "mutation" in a query language such as GraphQL, is an operation that inserts data into a database and/or modifies data already written to a database. Mutations may be contrasted with queries which retrieve data from databases. In general, mutations may have the same form as queries and may therefore be conceptually considered queries that perform one or more write operations to a database.

In the example depicted in FIG. 3A a mutable list field musicPlaybackQueue is defined and/or configured. In the example depicted in FIG. 3A, in response to receipt of schema 302 with the added directive @mutable, context aggregator system 138 writes a database for the specified field (e.g., musicPlaybackQueue), or other object type, and automatically generates a function that returns the specified field (e.g., the list musicPlaybackQueue). Additionally, context aggregator system 138 automatically generates extensions to the schema 302 to support database operations such as those depicted in FIGS. 3B, 3C, and 5A-5J. The database operations associated with the directive (e.g., with the schema modification) are exposed by an API of context aggregator system 138.

Figure 3B:
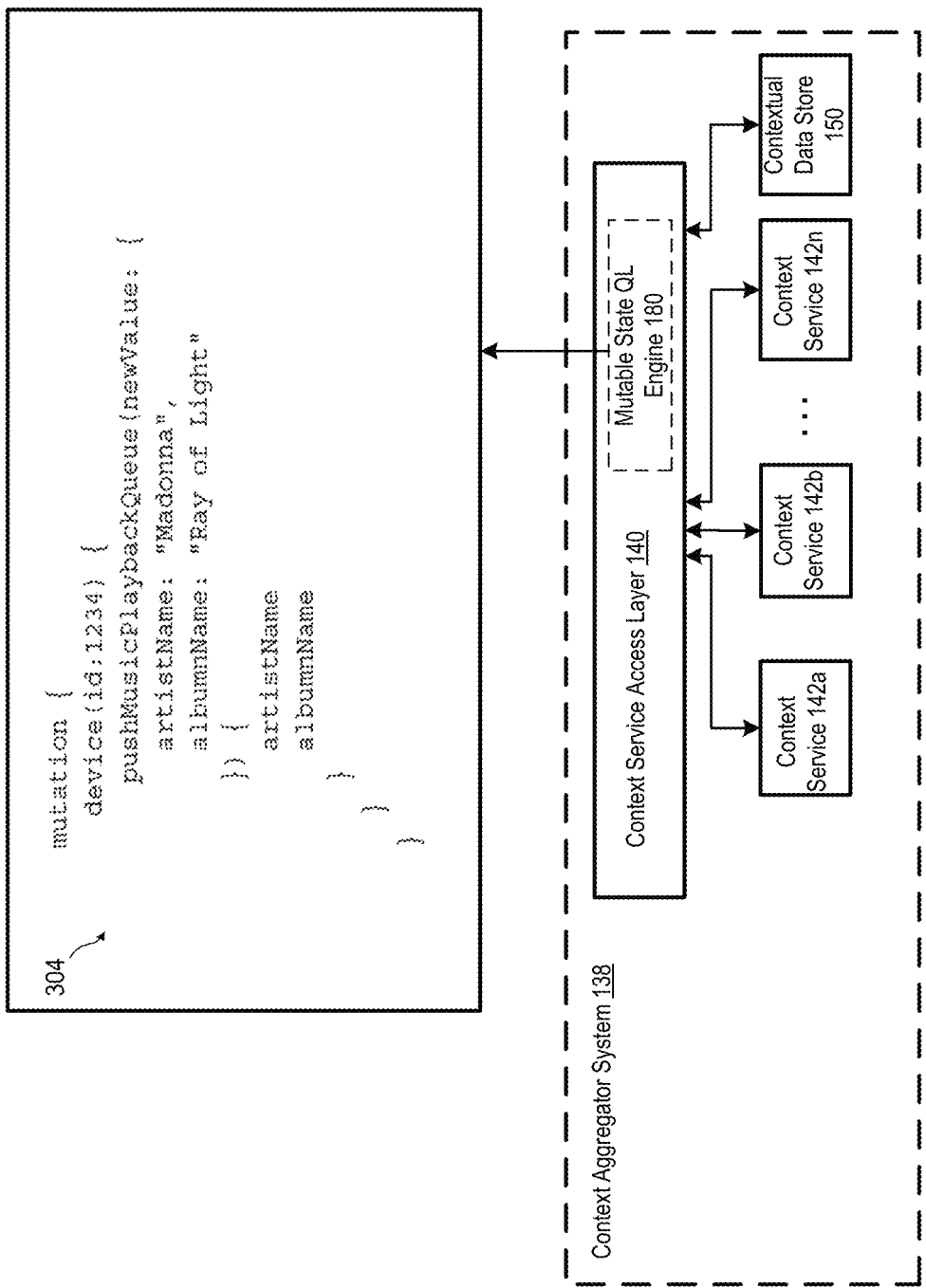
FIG. 3B depicts an example mutation operation that may be provided by a context service access layer, in accordance with various embodiments of the present disclosure.

In the example depicted in FIG. 3B, the push operation, which may be exposed by mutable state QL engine 180 to speech processing system 120 (FIG. 1) and/or skills associated with speech processing system 120, is used to append state to the musicPlaybackQueue field. An extension to the schema supporting the push operation may be automatically generated by the mutable state QL engine 180 in response to the addition of a specified directive to the schema (e.g., the @mutable directive modifying schema 302 in FIG. 3A). In the example in FIG. 3B, the artistName: "Madonna" and albumnName: "Ray of Light" is pushed into the musicPlaybackQueue field using the push operation exposed by mutable state QL engine 180. Accordingly, if a music skill and/or a speech processing component such as orchestrator 230 determines that the album "Ray of Light" by the artist "Madonna" has been added to a current music queue associated with the skill, the music skill may use the push operation exposed by mutable state QL engine 180 to store the artist and album information for the mutable field musicPlaybackQueue. The mutation represented by query 304 may be an example of transient contextual data that contextualizes a particular device, user, IP address, etc. Accordingly, the data may be stored in a database of contextual data store 150 which may be automatically generated by context aggregator system 138 in response to the modified schema 302 depicted in FIG. 3A.

Figure 3C:
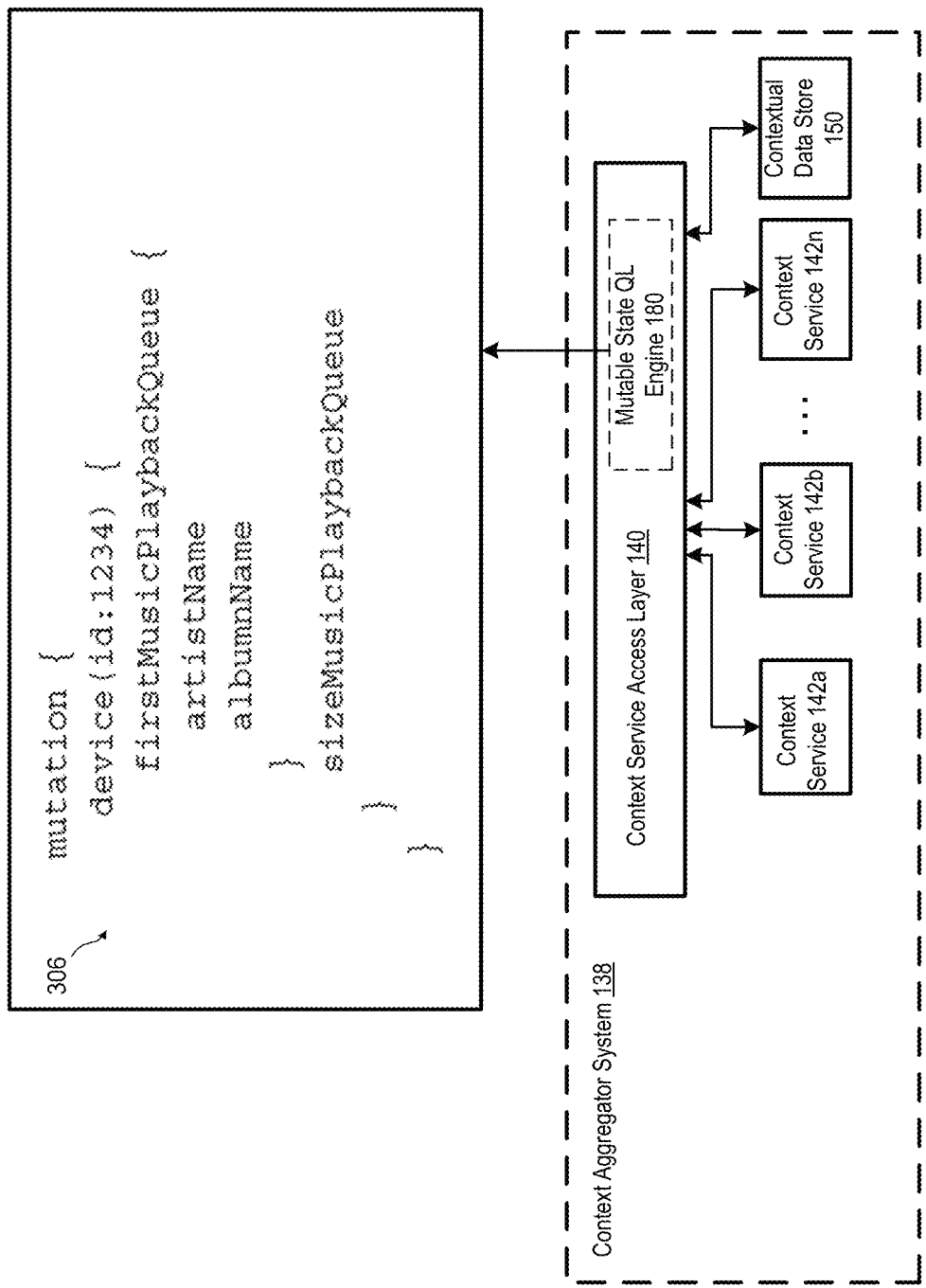
FIG. 3C depicts an example query operation that may be provided by a context service access layer, in accordance with various embodiments of the present disclosure.

FIG. 3C depicts an example query operation 306 that may be exposed by mutable state QL engine 180 of context service access layer 140. Query operation 306 includes the "first" operation that returns the first item of the musicPlaybackQueue. Additionally, query operation 306 includes the "size" operation that returns the size of the list musicPlaybackQueue. The "first" and "size" operations may be exposed, provided, and/or otherwise made available by mutable state QL engine 180 so that skills and/or components of speech processing system 120 may store transient contextual data in context aggregator system 138 without having to write dedicated code to handle the storage of the transient data and without having to interrupt runtime operation of context aggregator system 138. Extensions to the schema supporting the "first" and "size" operations may be automatically generated by the mutable state QL engine 180 in response to the addition of a specified directive to the schema 302 (depicted in FIG. 3A). In the example depicted in FIG. 3A, the directive is "@mutable".

Other examples of operations that may be provided by mutable state QL engine 180 of context service access layer 140 are described below in FIGS. 5A-5J. Extensions to the query language schema supporting the various operations described below in reference to FIGS. 5A-5J may be automatically generated in response to a modification of the schema to include a directive that is exposed by an API of context aggregator system 138. The various operations supported by a particular directive may be defined within context aggregator system 138 and may be published through an API of context aggregator system 138 in order to make the various operations (and the relevant directive(s)) available to publishers of contextual data so that such publishers may store and/or modify the contextual data through the context aggregator system 138 using the various operations.

Figure 4:
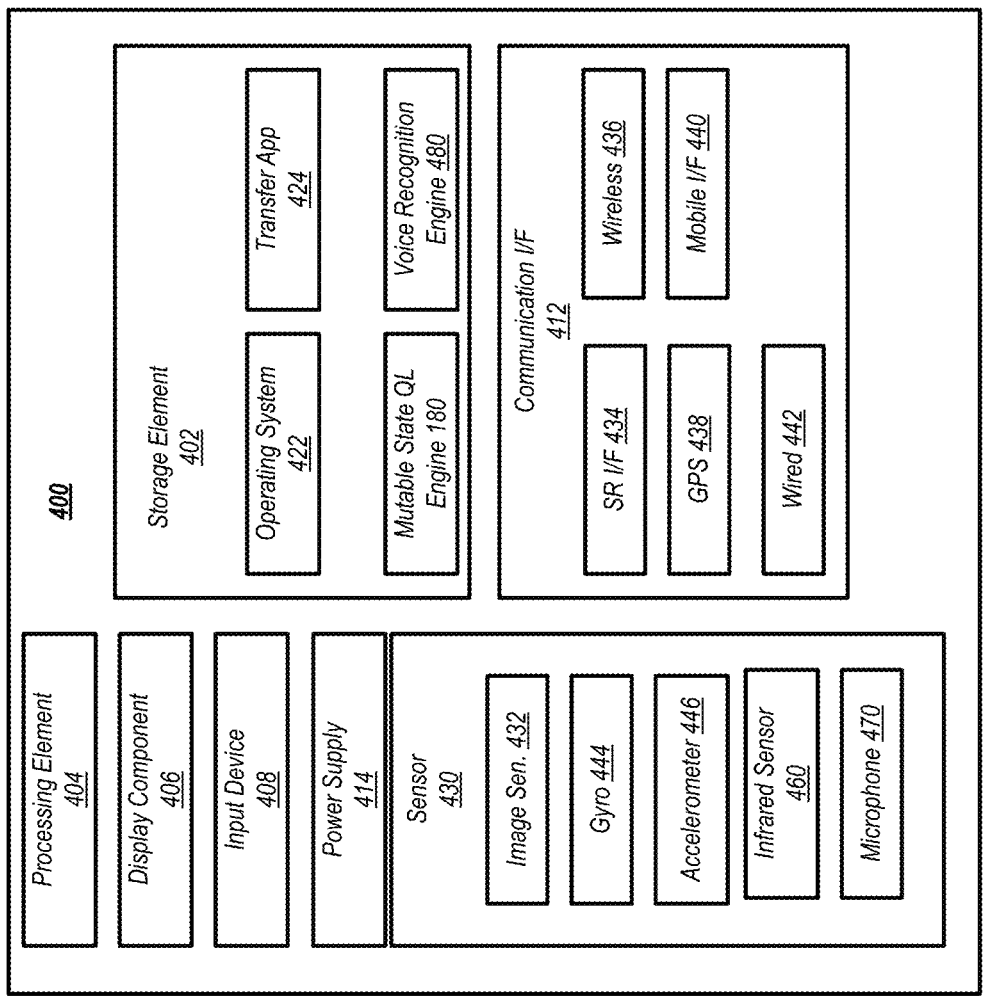
FIG. 4 is a conceptual diagram depicting a computing device that may be used in accordance with various aspects of the present disclosure.

FIG. 4 is a block diagram showing an example architecture 400 of a computing device, such as device 110, in accordance with various aspects of the present disclosure. It will be appreciated that not all devices will include all of the components of the architecture 400 and some user devices may include additional components not shown in the architecture 400. In some embodiments, computing systems may comprise one or more instances executing on one or more computing device hosts. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). The storage element 402 can include one or more different types of memory, data storage, or non-transitory computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc.

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400. In some examples, the transfer application 424 may also be configured to send the received voice commands to one or more voice recognition servers (e.g., speech processing system 120).

In some examples, storage element 402 may include a mutable state QL engine 180. As previously described, mutable state QL engine 180 may provide a mechanism for managing mutation of state within context aggregator system 138. Mutable state QL engine 180 may provide various operations that may be used by components of speech processing system 120 (e.g., natural language component 259) and/or first party and/or third party skills (e.g., skill 170) to store transient data within the underlying context services 142a, 142b, . . . , 142n of context aggregator system 138 without requiring specialized code that requires compilation and execution. In various examples, mutable state QL engine 180 may make various operations available to skills and/or speech processing system 120 through an API of context service access layer 140.

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice commands. Voice recognition engine 480 may interpret audio signals of sound captured by microphone 470. In some examples, voice recognition engine 480 may listen for a "wake-word" to be received by microphone 470. Upon receipt of the wake-word, voice recognition engine 480 may stream audio to a voice recognition server for analysis, as described above in reference to FIG. 2. In various examples, voice recognition engine 480 may stream audio to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module 436 configured to communicate on a network, such as the network 104, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. Some examples of the architecture 400 may include multiple image sensors 432. For example, a panoramic camera system may comprise multiple image sensors 432 resulting in multiple images and/or video frames that may be stitched and may be blended to form a seamless panoramic output. An example of an image sensor 432 may be a camera configured to capture color information, image geometry information, and/or ambient light information.

Motion sensors may include any sensors that sense motion of the architecture including, for example, gyro sensors 444 and accelerometers 446. Motion sensors, in some examples, may be used to determine an orientation, such as a pitch angle and/or a roll angle, of a device. The gyro sensor 444 may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. The accelerometer 446 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 438 may be utilized as a motion sensor. For example, changes in the position of the architecture 400, as determined by the GPS interface 438, may indicate the motion of the GPS interface 438. Infrared sensor 460 may be effective to determine a distance between a surface and the device including the infrared sensor 460. In some examples, the infrared sensor 460 may determine the contours of the surface and may be capable of using computer vision techniques to recognize facial patterns or other markers within the field of view of the infrared sensor 460's camera. In some examples, the infrared sensor 460 may include an infrared projector and camera. Processing element 404 may build a depth map based on detection by the infrared camera of a pattern of structured light displayed on a surface by the infrared projector. In some other examples, the infrared sensor 460 may include a time of flight camera that may compute distance based on the speed of light by measuring the time of flight of a light signal between a camera of the infrared sensor 460 and a surface. Further, in some examples, processing element 404 may be effective to determine the location of various objects in the physical environment within the field of view of a device based on the depth map created by the infrared sensor 460. As noted above, in some examples, non-infrared depth sensors, such as passive stereo camera pairs, or non-identical camera pairs, may be used in device in place of, or in addition to, infrared sensor 460. Processing element 404 may be effective to determine the location of various objects in the physical environment within the field of view of a camera of architecture 400 based on the depth map created by one or more non-infrared depth sensors.

FIGS. 5A-5J depict various examples of operations that may be exposed or otherwise made available by mutable state QL engine 180. In various examples, the operations described in FIGS. 5A-5J may be atomic operations insofar as each operation is indivisible in terms of a database transaction such that the entire operation either successfully completes or fails during a database transaction (e.g., one or more read or write operation). Additionally, the various example operations depicted in FIGS. 5A-5J are shown for illustrative purposes only. In various examples, additional operations may be added and different operations may be included apart from those depicted for exemplary purposes herein. Examples of other operations that are not depicted, but are explicitly contemplated herein, include support for optimistic locking, top-level entity mutations (e.g., support for mutation on entities that can be directly referenced independent of all other entities), linking of top-level entities to any object, linking of lists of entities to any object, mutation on fields of top-level entities, (e.g., adding a music playback state to a particular device, such as device 110), etc. The various example operations described in FIGS. 5A-5J may be used to store contextual data in context aggregator system 138. Extensions to the query language schema supporting the various operations described in reference to FIGS. 5A-5J may be automatically generated by the mutable state QL engine 180 in response to modification of a specified directive to the schema by a publisher of contextual data. The various operations supported by a particular directive may be defined within context aggregator system 138 and may be published through an API of context aggregator system 138 in order to make the various operations (and the relevant directive(s)) available to publishers of contextual data so that such publishers may store and/or modify the contextual data through the context aggregator system 138 using the various operations.

In various examples, a request for a top-level entity may be a request for contextual data related to a particular user request (e.g., a user utterance), a device identifier (e.g., a particular device), a user account, and/or a user. In the various operations below, a field may refer to a field of a database. Additionally, in some examples, a field value may refer to a value stored within a field of a database.

FIG. 5A depicts a "delete" operation that may be exposed by mutable state QL engine 180. In an example, the delete operation may delete the current value of the field and return the value of the field at the time of deletion. FIG. 5B depicts an "exists" operation that may be exposed by mutable state QL engine 180. In an example, the exists operation may return true if the field is currently set. FIG. 5C depicts a "revision_of" operation that may be exposed by mutable state QL engine 180. In an example, the revision_of operation may return the current revision number of the specified field. In various examples, the revision number may be used for optimistic write operations (e.g., a write operation that assumes that no interfering write operations have occurred since the last transaction commit).

FIG. 5D depicts a "timestamp_of" operation that may be exposed by mutable state QL engine 180. In an example, the timestamp_of operation may return the current timestamp of the specified field (e.g., the time at which the field was last modified). FIG. 5E depicts a "set" operation that sets a value and returns the current value after the operation is complete. In various examples, the set operation may be conditioned using the various parameters depicted in FIG. 5E. For example, the set operation may be conditioned on an existing value, the lack of an existing value, and/or a particular version of a field. The set operation may be exposed by mutable state QL engine 180.

FIG. 5F depicts a "get_set" operation that may be exposed by mutable state QL engine 180. In an example, the get_set operation may unconditionally set a value and return the previous value. Optionally, the get_set operation may be conditioned using the various parameters depicted in FIG. 5F. For example, the get_set operation may be conditioned on an existing value, the lack of an existing value, and/or a particular version of a field. FIG. 5G depicts an "add" operation that may be exposed by mutable state QL engine 180. In an example, the add operation may increment an integer value by a specified number (e.g., by the parameter delta).

FIG. 5H depicts a "first" operation that may be exposed by mutable state QL engine 180. In an example, the first operation may return the first value of a list. FIG. 5I depicts a "last" operation that may be exposed by mutable state QL engine 180. In an example, the last operation may return the last value of a list. FIG. 5J depicts a "get" operation that may be exposed by mutable state QL engine 180. In an example, the get operation may return a subset of a list and may take the parameters "start" (e.g., a first index value of the subset) and "end" (e.g., a last index value of the subset).

The foregoing operations depicted and described with respect to FIGS. 5A-5J are for illustrative purposes only of example operations that may be exposed, provided, and/or otherwise made available by mutable state QL engine 180 for the storage of transient contextual data. The various operations may be associated with one or more directives exposed by mutable state QL engine 180 or by some other component of context aggregator system 138. Other example operations may include a "push" operation that appends a new element to the end of a list, a "pop" operation that removes an element from the end of a list and returns it, an "unshift" operation that prepends a new element to the start of a list, a "shift" operation that removes an element from the start of a list and returns it, a "trim" operation that removes all but a subset of the list and returns the list, etc. Additionally, mutable state QL engine 180 may allow configuration of complex structures. The mutable state QL engine 180 may define an Input Type with identical schema to the desired Object Type. In cases where the fields of the Object Type cannot be mapped, they may be omitted from the Input Type.

Concurrency controls are implicit in various atomic operations described above. For example, concurrent "add" operations as described above in reference to FIG. 5G, result in the expected final result regardless of the order of operation. Additionally, "unshift" and "push" operations result in the objects added to the list exactly once. Similarly, "pop" and "shift" operations result in the objects being removed and returned (respectively) from the list exactly once.

Additionally, explicit concurrency controls may be provided by mutable state QL engine 180. For example, a query may be used to check the revision (e.g., the "revision_of" operation described above in reference to FIG. 5C may be used to determine the revision number) number of a value. Every change to a value stored in a mutable field results in an increase in the revision number associated with the field. If the revision number has not changed, a determination may be made that no concurrency issue exists as the revision number of the field matches the expected value. For example, if a concurrency check is performed and the revision number has not changed, previous operations (e.g., the "set" operation described above in reference to FIG. 5E) may be used to mutate a current value. In various examples, the changes may be made conditional upon the revision number not changing (e.g., using an "if" operation). For example, a determination may be made that no concurrency issue exists based on the current revision number of the field matching an expected revision number (e.g., the previous revision number) Similarly, the "set" operation may be used to set a new value conditional on the previous value not changing. In another example of an explicit concurrency control, a producer of transient contextual data (e.g., a skill developer and/or component of speech processing system 120) may set a new value conditional on the timestamp of the existing value being older than a passed-in value. Every change to a value stored in a mutable field results in a timestamp of the field being changed. In another example, an existence-based concurrency control may be used. For example, a skill developer or other transient contextual data producer may set a value conditional on the value not having been set.

In various examples, the context aggregator system 138 may include a data retention policy. For example, a process may check all entities in the storage (e.g., within context services 142a, 142b, . . . , 142n) and may evict data with a timestamp older than a predefined allowable timestamp. Additionally, in some examples, a process may check all entities and may calculate the total storage space used per field. Deletion of a top-level entity may delete all dependent entity data associated with the top-level entity.

Figure 6:
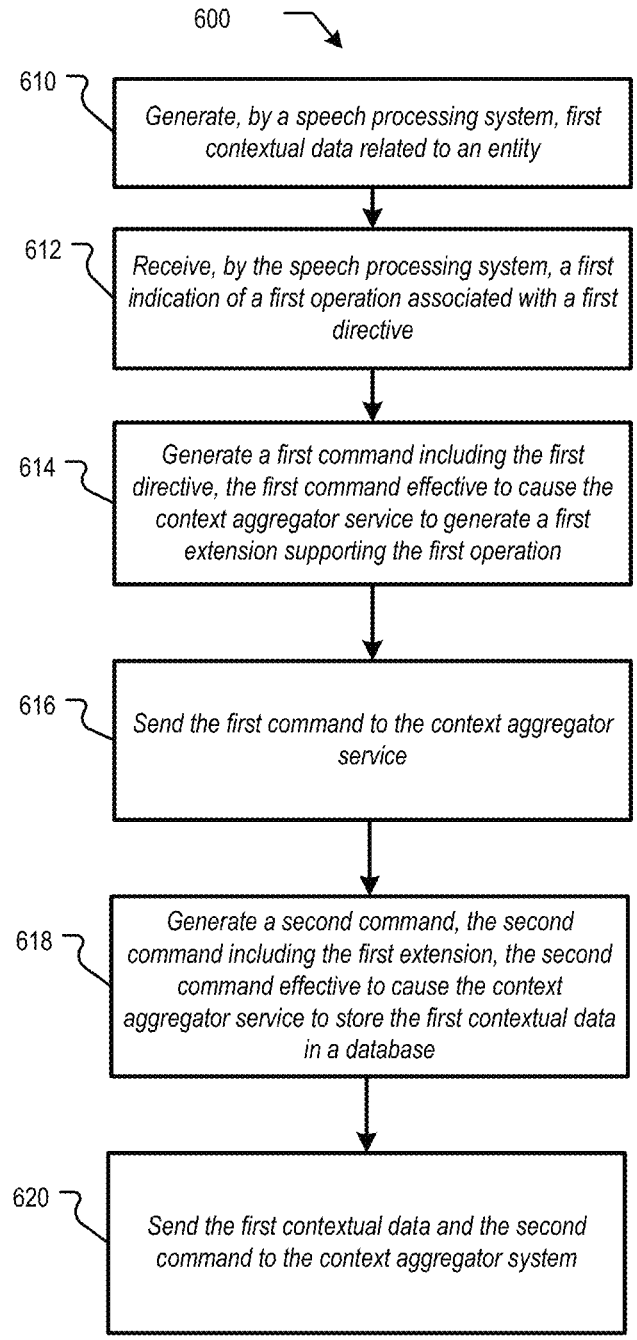
FIG. 6 depicts a flow chart showing an example process for providing a mutation architecture for a context aggregator system, in accordance with various aspects of the present disclosure.

FIG. 6 depicts a flow chart showing an example process 600 for providing a mutation architecture for a contextual data aggregator, in accordance with various aspects of the present disclosure. The actions of the process 600 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

In some examples, process 600 may begin at action 610, "Generate, by a speech processing system, first contextual data related to an entity". At action 610, one or more computing devices (e.g., speech processing system 120) may generate first contextual data related to an entity. In various examples, a 1P and/or 3P skill associated with speech processing system 120 may generate contextual data while performing an action in response to a user utterance. For example, a music skill may generate contextual data related to an artist name, album name, and/or song name upon adding a song to a music playback queue in response to a user request. In some other examples, a different component of speech processing system 120 may generate contextual data. For example, natural language component 259 (FIG. 2) may generate contextual data related to a user request and/or related to a determined intent.

In various examples, process 600 may continue from action 610 to action 612, "Receive, by the speech processing system, a first indication of a first operation associated with a directive." At action 612, the skill and/or other component of speech processing system 120 may receive a first indication of a first operation that is associated with a first directive. In various examples, context service access layer 140 (e.g., an API of context aggregator system 138) may expose a one or more operations that may be associated with a directive used to modify a schema of a query language used by the context aggregator system 138.

Processing in process 600 may continue from action 612 to action 614, "Generate a first command including the first directive, the first command effective to cause the context aggregator system to generate a first extension supporting the first operation." At action 614, a command may be generated. In various examples, the first command may define an object type and may include a directive (for example, the command depicted in FIG. 3A defines a list musicPlaybackQueue and includes the directive @mutable). The first command may be effective to cause the context aggregator system 138 to generate extensions for a plurality of operations associated with the directive. Additionally, the first command may be effective to cause the context aggregator system 138 to automatically create a database for storing objects of the type defined in the command. For example, in FIG. 3A, depicted above, a database for storing the object musicPlaybackQueue is created in response to the directive @mutable being added to the object type definition shown in FIG. 3A.

Processing in process 600 may continue from action 614 to action 616, "Send the first command to the context aggregator system". At action 616, the first command may be sent to the context aggregator system 138. In various examples, the first command may be sent to context aggregator system 138 by a speech processing component (e.g., orchestrator 230) in order to publish the contextual data to the context aggregator system 138.

Processing in process 600 may continue from action 616 to action 618, "Generate a second command, the second command including the first extension, the second command effective to cause the context aggregator system to store the first contextual data in a database". At action 618, the speech processing component may generate a second command that includes the first extension. In the current example, the extension may be an extension of a "set" operation used to set a value in a database, as described above.

Processing in process 600 may continue from action 618 to action 620, "Send the first contextual data and the second command to the context aggregator system." At action 620 the second command may be used to set the first contextual data in the database generated in response to the first directive included in the first command.

Figure 7:
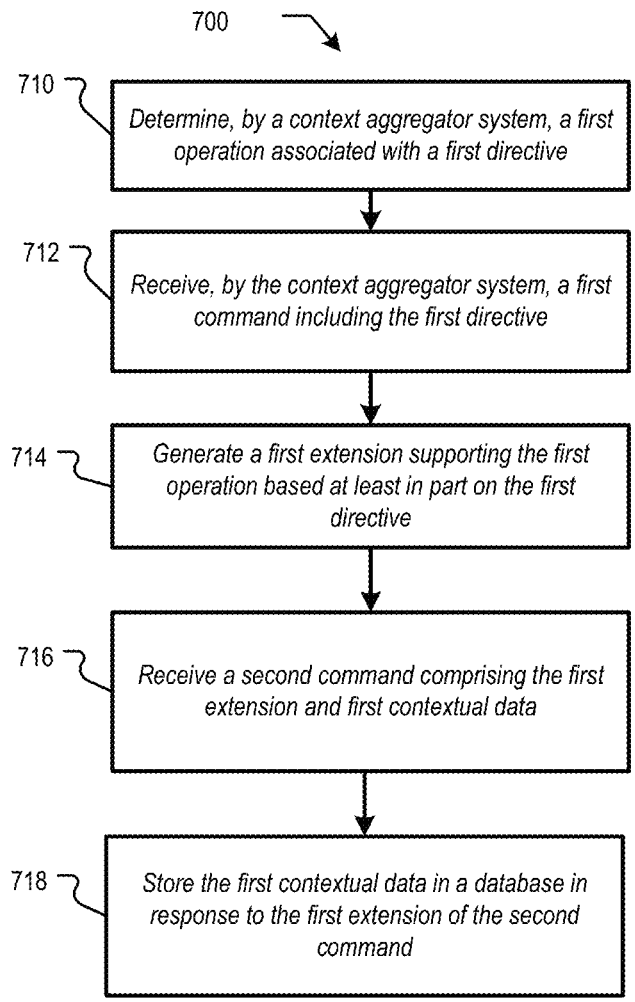
FIG. 7 depicts a flow chart showing another example process for providing a mutation architecture for a context aggregator system, in accordance with various aspects of the present disclosure.

FIG. 7 depicts a flow chart showing an example process 700 for providing a mutation architecture for a contextual data aggregator, in accordance with various aspects of the present disclosure. The actions of the process 700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

In some examples, process 700 may begin at action 710, "Determine, by a context aggregator system, a first operation associated with a first directive". At action 710, one or more computing devices (e.g., one or more computing devices of context aggregator system 138) may determine a plurality of operations (including the first operation) available for storing and/or modifying contextual data. The plurality of operations may be associated with a first directive. The plurality of operations may be exposed via an API of the context aggregator system 138. For example, the one or more atomic operations described above in reference to FIGS. 5A-5J, for modifying and/or storing contextual data, may be exposed by the API of the context aggregator system 138. The one or more operations may be associated with a directive that may be used to modify a schema of the query language associated with context aggregator system in order to automatically generate extensions supporting the one or more operations.

In various examples, process 700 may continue from action 710 to action 712, "Receive, by the context aggregator system, a first command including the first directive". At action 712, the context aggregator system 138 may receive a command including the first directive. In various examples, the first command may define an object type and may include a directive (for example, the command depicted in FIG. 3A defines a list musicPlaybackQueue and includes the directive @mutable). The first command may be effective to cause the context aggregator system 138 to generate extensions for a plurality of operations associated with the directive. Additionally, the first command may be effective to cause the context aggregator system 138 to automatically create a database for storing objects of the type defined in the command. For example, in FIG. 3A, depicted above, a database for storing the object musicPlaybackQueue is created in response to the directive @mutable being added to the object type definition shown in FIG. 3A.

In various examples, process 700 may continue from action 712 to action 714, "Generate a first extension supporting the first operation based at least in part on the first directive". At action 714, context aggregator system 138 may generate a first extension supporting the first operation in response to the first command including the first directive. Additionally, as described above, the context aggregator system 138 may automatically create a database for storing objects of the type defined by the first command.

Processing in process 700 may continue from action 714 to action 716, "Receive a second command comprising the first extension and first contextual data." In various examples, the context aggregator system 138 may receive a second command that includes the first extension and first contextual data. The first extension may be effective to cause the first operation to be performed. The first contextual data may serve as a parameter for the first operation. In various examples, if the first operation is a set operation, the first contextual data may be the data to be set in a field of the database.

Processing in process 700 may continue from action 716 to action 718, "Store the first contextual data in a database in response to the first extension of the second command". At action 718, the first contextual data may be stored in a database in response to the first extension included in the second command. In the current example, the first extension may support the "set" operation described above. However, various other extensions for various other operations may be instead used. Additionally, in various examples, the database for storing the first contextual data may be created in response to the first directive included in the first command, as previously described.

Among other potential benefits, a system in accordance with the present disclosure may allow a producer of transient contextual data (e.g., contextual data that does not have a predefined and/or dedicated store within a context service) to modify the schema of the query language provided at a context service access layer by including one or more directives in order to store such transient contextual data without having to write any code and without having to take the context aggregator system offline. In various examples, an API of the context service access layer (e.g., mutable state QL engine 180) may provide directives and/or operations that may be used to append state data and otherwise perform mutability operations on data stored within the context aggregator system. Modifying a schema of the query language with a directive may automatically generate extensions supporting operations associated with that directive. Additionally, modifying a schema by including such a directive may be effective to cause the context aggregator system to automatically create a database to store one or more object types defined in the modified schema. Accordingly, the various techniques described herein allow a flexible approach to providing a universal access layer for contextual data that may be generated during skill execution and/or speech processing, as described herein. Furthermore, a number of concurrency controls are available to ensure data consistency across multiple database transactions.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system, such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method of storing speech-processing data, the method comprising:

receiving, at a speech processing system from a computing device, first input audio data comprising a digital representation of a first utterance spoken by a user of the computing device;

performing a first speech recognition process on the first input audio data to generate first text data representing the first utterance;

determining a first intent representing a first semantic interpretation of the first text data;

determining a first action corresponding to the first intent;

performing the first action by sending the first intent to a first skill associated with the first action, wherein first contextual data is generated by the first skill during performance of the first action and wherein the first contextual data comprises a first value;

determining, from a context aggregator system, a first operation associated with a first directive, wherein the first operation is operable to store the first value of the first contextual data in a database;

generating a first command effective to cause the context aggregator system to create an object type, the first command including the first directive, wherein the first directive is effective to cause the context aggregator system to generate a first extension supporting the first operation;

sending the first command to the context aggregator system;

generating a first query including the first extension, the first query effective to cause the context aggregator system to store the first value of the first contextual data in the database; and sending the first query to the context aggregator system.

2. The method of claim 1, further comprising modifying, by the speech processing system, a database schema of a query language provided by the context aggregator system to include the first directive.

3. The method of claim 1, the method further comprising:

determining, from the context aggregator system, a second operation associated with the first directive, wherein the second operation returns a revision number of a field of the database, and wherein the first directive of the first command is further effective to cause the context aggregator system to generate a second extension supporting the second operation;

generating a second query including the second extension, the second query effective to cause the context aggregator system to perform the second operation on the field;

determining the revision number of the field in response to the second query; and determining that no concurrency issue exists based on the revision number of the field matching an expected revision number.

4. A method, comprising:

generating first contextual data related to an entity;

receiving, from a context aggregator system, a first indication of a first operation associated with a first directive, wherein the first operation is operable to store the first contextual data;

generating, by a speech processing system, a first command including the first directive, wherein the first command is effective to cause the context aggregator system to generate a first extension supporting the first operation;

sending the first command to the context aggregator system;

generating, by the speech processing system, a second command using a query language associated with the context aggregator system, wherein the second command comprises the first extension, the second command effective to cause the context aggregator system to store the first contextual data in a database; and sending the first contextual data and the second command to the context aggregator system.

5. The method of claim 4, further comprising:

receiving, from the context aggregator system, a second indication of a second operation associated with the first directive, wherein the second operation is effective to modify a state of the first contextual data in the database, and wherein the first command is further effective to cause the context aggregator system to generate a second extension supporting the second operation;

generating, by the speech processing system, a third command using the query language, wherein the third command comprises the second extension, the third command effective to modify the state of the first contextual data in the database; and sending the third command to the context aggregator system.

6. The method of claim 4, further comprising:

receiving, from a context aggregator service, a database schema; and modifying the database schema to include the first directive.

7. The method of claim 4, further comprising:

determining, by the speech processing system, that the first contextual data comprises transient contextual data, wherein the generating the first command including the first directive is effective to cause the context aggregator system to generate the database effective to store the first contextual data.

8. The method of claim 4, further comprising:

generating, by the speech processing system, a third command using the query language, wherein the third command comprises a second extension related to a second operation effective to return at least one of a revision number of a field of the database or a timestamp of the field of the database;

sending the third command to the context aggregator system;

receiving, from the context aggregator system, at least one of the revision number of the field or the timestamp of the field; and determining that a concurrency issue exists based on the revision number of the field or the timestamp of the field.

9. The method of claim 4, further comprising determining a plurality of other operations associated with the first directive, wherein a second operation of the plurality of other operations comprises an atomic database operation, and wherein the plurality of other operations are associated with the first directive included in the first command.

10. The method of claim 4, further comprising determining that the first contextual data is related to a spoken request received by the speech processing system and semantically interpreted by a natural language understanding component of the speech processing system, wherein the first contextual data comprises an identifier of the spoken request.

11. The method of claim 4, further comprising:

generating the first command further comprising defining an object type using the query language associated with the context aggregator system, wherein the first directive included in the first command is effective to cause the context aggregator system to write the database to store objects of the object type.

12. A system comprising:

at least one processor; and a computer-readable non-transitory memory storing instructions that when executed by the at least one processor cause the at least one processor to perform a method comprising:

determining a first operation associated with a first directive, wherein the first operation is operable to store contextual data related to speech processing;

receiving, from a component of a speech processing system, a first command including the first directive;

generating, based at least in part on the first directive, a first extension supporting the first operation;

receiving, from the component of the speech processing system, a second command comprising the first extension and first contextual data; and storing the first contextual data in a database based at least in part on the first extension.

13. The system of claim 12, further comprising instructions that when executed by the at least one processor, cause the at least one processor perform the method further comprising:

determining, a second operation associated with the first directive, wherein the second operation is effective to modify a state of the first contextual data in the database;

generating, based at least in part on the first directive, a second extension supporting the second operation;

receiving, a third command, wherein the third command comprises the second extension; and modifying the state of the first contextual data in the database based at least in part on the third command.

14. The system of claim 12, further comprising instructions that when executed by the at least one processor, cause the at least one processor perform the method further comprising:

providing, to a speech processing component, a first database schema, wherein the first database schema is provided through an application programming interface;

receiving, by a context aggregator system, a modified database schema, wherein the modified database schema represents a modification of the first database schema to include the first directive; and generating a second extension, based at least in part on the modified database schema, wherein the second extension supports a second operation associated with the first directive.

15. The system of claim 12, further comprising instructions that when executed by the at least one processor, cause the at least one processor perform the method further comprising:

receiving, a third command, wherein the third command comprises a second extension of a second operation effective to return at least one of a revision number of a field of the database or a timestamp of the field of the database;

determining the revision number of the field or the timestamp of the field in response to the third command; and determining that a concurrency issue exists based on the revision number of the field or the timestamp of the field.

16. The system of claim 12, further comprising instructions that when executed by the at least one processor, cause the at least one processor perform the method further comprising exposing, by an application programming interface, an indication of the first operation in association with the first directive.

17. The system of claim 12, further comprising instructions that when executed by the at least one processor, cause the at least one processor perform the method further comprising providing a plurality of other operations, wherein the plurality of other operations are atomic database operations, and wherein the plurality of other operations are associated with the first directive.

18. The system of claim 12, further comprising instructions that when executed by the at least one processor, cause the at least one processor perform the method further comprising:

determining that the first contextual data is related to a spoken request received by a speech processing device and semantically interpreted by a natural language understanding component of the speech processing device; and storing an identifier of the spoken request in association with the first contextual data in the database.

19. The system of claim 12, further comprising instructions that when executed by the at least one processor, cause the at least one processor perform the method further comprising, in response to the first command, generating the database to store objects of an object type specified by the first command.

20. The system of claim 12, further comprising instructions that when executed by the at least one processor, cause the at least one processor perform the method further comprising:

determining that a value is stored in a field of the database based at least in part on the first operation of the second command, wherein the field is specified in the second command; and in response to the determination that the value is stored in the field of the database, returning indicator data indicating that the value is stored in the field.

* * * * *